(12) United States Patent
Polzin et al.

(10) Patent No.: US 9,202,061 B1
(45) Date of Patent: Dec. 1, 2015

(54) SECURITY ENCLAVE PROCESSOR BOOT CONTROL

(71) Applicant: Apple Inc., Cupertino, CA (US)

(72) Inventors: R. Stephen Polzin, San Jose, CA (US); Fabrice L. Gautier, San Jose, CA (US); Mitchell D. Adler, Los Gatos, CA (US); Timothy R. Paaske, Cupertino, CA (US); Michael J. Smith, San Francisco, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 14/696,622

(22) Filed: Apr. 27, 2015

Related U.S. Application Data

(63) Continuation of application No. 13/626,585, filed on Sep. 25, 2012, now Pat. No. 9,047,471.

(51) Int. Cl.
| | |
|---|---|
| *G06F 15/177* | (2006.01) |
| *G06F 9/24* | (2006.01) |
| *G06F 1/24* | (2006.01) |
| *G06F 7/04* | (2006.01) |
| *H04N 7/16* | (2011.01) |
| *G06F 21/57* | (2013.01) |
| *G06F 21/60* | (2013.01) |
| *G06F 12/14* | (2006.01) |
| *G06F 9/44* | (2006.01) |
| *G06F 9/445* | (2006.01) |
| *G06F 21/00* | (2013.01) |

(52) U.S. Cl.
CPC .............. *G06F 21/575* (2013.01); *G06F 12/14* (2013.01); *G06F 21/60* (2013.01); *G06F 1/24* (2013.01); *G06F 9/24* (2013.01); *G06F 9/4401* (2013.01); *G06F 9/44505* (2013.01); *G06F 21/00* (2013.01); *G06F 21/572* (2013.01)

(58) Field of Classification Search
None
See application file for complete search history.

(56) References Cited

U.S. PATENT DOCUMENTS

| 5,737,240 | A | 4/1998 | Ellsworth et al. |
| 6,601,133 | B2 | 7/2003 | Zakai et al. |
| 6,704,871 | B1 | 3/2004 | Kaplan et al. |
| 6,961,791 | B2 * | 11/2005 | Cepulis .......................... 710/104 |
| 7,043,616 | B1 | 5/2006 | McGrath |
| 7,082,507 | B1 | 7/2006 | Christie et al. |

(Continued)

OTHER PUBLICATIONS

R. Stephen Polzin et al., "Key Management Using Security Enclave Processor," U.S. Appl. No. 13/626,476, filed Sep. 25, 2012, 62 pages.

(Continued)

*Primary Examiner* — Ji H Bae
(74) *Attorney, Agent, or Firm* — Meyertons, Hood, Kivlin, Kowert & Goetzel, P.C.; Lawrence J. Merkel

(57) ABSTRACT

An SOC implements a security enclave processor (SEP). The SEP may include a processor and one or more security peripherals. The SEP may be isolated from the rest of the SOC (e.g. one or more central processing units (CPUs) in the SOC, or application processors (APs) in the SOC). Access to the SEP may be strictly controlled by hardware. For example, a mechanism in which the CPUs/APs can only access a mailbox location in the SEP is described. The CPU/AP may write a message to the mailbox, which the SEP may read and respond to. The SEP may include one or more of the following in some embodiments: secure key management using wrapping keys, SEP control of boot and/or power management, and separate trust zones in memory.

18 Claims, 14 Drawing Sheets

(56) References Cited

U.S. PATENT DOCUMENTS

| | | |
|---|---|---|
| 7,130,951 B1 | 10/2006 | Christie et al. |
| 7,130,977 B1 | 10/2006 | Christie et al. |
| 7,146,477 B1 | 12/2006 | Strongin et al. |
| 7,165,135 B1 | 1/2007 | Christie et al. |
| 7,210,009 B2 | 4/2007 | Gulick et al. |
| 7,334,123 B2 | 2/2008 | Gulick et al. |
| 7,401,223 B2 | 7/2008 | Walmsley |
| 7,401,358 B1 | 7/2008 | Christie et al. |
| 7,493,498 B1 | 2/2009 | Schmidt et al. |
| 7,496,966 B1 | 2/2009 | McGrath et al. |
| 7,603,550 B2 | 10/2009 | McGrath et al. |
| 7,603,551 B2 | 10/2009 | McGrath et al. |
| 7,865,733 B2 | 1/2011 | Goto et al. |
| 7,937,757 B2 | 5/2011 | Focke et al. |
| 8,543,838 B1 | 9/2013 | Au et al. |
| 8,615,799 B2 | 12/2013 | Henry et al. |
| 8,627,032 B2 | 1/2014 | Zbiciak |
| 8,645,716 B1* | 2/2014 | Dujari et al. ............. 713/193 |
| 8,775,757 B2 | 7/2014 | Polzin et al. |
| 8,832,465 B2 | 9/2014 | Gulati et al. |
| 8,873,747 B2 | 10/2014 | Polzin et al. |
| 9,043,632 B2 | 5/2015 | Machnicki et al. |
| 9,047,471 B2 | 6/2015 | Polzin et al. |
| 2001/0047452 A1* | 11/2001 | Okada et al. ............. 711/115 |
| 2003/0074571 A1 | 4/2003 | Fujiwara et al. |
| 2004/0068644 A1 | 4/2004 | Hutton et al. |
| 2004/0257898 A1* | 12/2004 | Ozawa et al. ............. 365/213 |
| 2006/0143396 A1* | 6/2006 | Cabot ..................... 711/134 |
| 2006/0291304 A1* | 12/2006 | Rothman et al. ........... 365/200 |
| 2007/0239977 A1* | 10/2007 | Wu ......................... 713/2 |
| 2007/0260867 A1* | 11/2007 | Ethier et al. .............. 713/2 |
| 2007/0260869 A1* | 11/2007 | Dade et al. ............... 713/2 |
| 2008/0052534 A1* | 2/2008 | Harada et al. ............. 713/190 |
| 2008/0162848 A1 | 7/2008 | Broyles et al. |
| 2008/0183968 A1* | 7/2008 | Huang ..................... 711/125 |
| 2008/0222428 A1 | 9/2008 | Dellow |
| 2009/0172379 A1* | 7/2009 | Rothman et al. ........... 713/2 |
| 2009/0222653 A1* | 9/2009 | Findeisen et al. .......... 713/2 |
| 2009/0222915 A1 | 9/2009 | Challener et al. |
| 2009/0249098 A1 | 10/2009 | Han et al. |
| 2010/0042858 A1 | 2/2010 | Padhye et al. |
| 2012/0042175 A1 | 2/2012 | Lin et al. |
| 2012/0272027 A1 | 10/2012 | Zbiciak |
| 2012/0303941 A1 | 11/2012 | Grieco et al. |
| 2013/0159726 A1 | 6/2013 | McKeen et al. |
| 2014/0089712 A1* | 3/2014 | Machnicki et al. ......... 713/324 |
| 2014/0281616 A1 | 9/2014 | Moran et al. |

OTHER PUBLICATIONS

Erik P. Machnicki et al., "Security Enclave Processor Power Control," U.S. Appl. No. 13/626,522, filed Sep. 25, 2012, 61 pages.

R. Stephen Polzin et al., Trust Zone Support in System on a Chip Having Security Enclave Processor, U.S. Appl. No. 13/626,546, filed Sep. 25, 2012, 63 pages.

Manu Gulati et al., "Security Enclave Processor for a System on a Chip," U.S. Appl. No. 13/626,566, filed Sep. 25, 2012, 60 pages.

Intel® Trusted Execution Technology (Intel® TXT) Software Development Guide Measured Launched Environment 5 Developer's Guide, Mar. 2011, 112 pages.

ARM Security Technology Building a Secure System using Trustzone® Technology, Copyright © 2005-2009 ARM Limited. All rights reserved, PRD29-GENC-009492C ,Unrestricted, 108 pages.

TCG Mobile Trusted Module Specification, Specification Version 1.0, Revision 7.02, Apr. 29 2010,TCG Published Copyright © TCG 2010, 103 pages.

TPM Main Part 1 Design Principles, Specification Version 1.2, Revision 116, Mar. 1, 2011, TCG Published, Copyright © 2003-2011 Trusted Computing Group, Incorporated, 184 pages.

TPM Main Part 2 TPM Structures, Specification version 1.2, Level 2 Revision 116, Mar. 1, 2011, TCG Published, Copyright © 2003-2011 Trusted Computing Group, Incorporated, 202 pages.

TPM Main Part 3 Commands, Specification Version 1.2, Level 2 Revision 116, Mar. 1, 2011, TCG Published, Copyright © 2003-2011 Trusted Computing Group, Incorporated, 339 pages.

Intel® Trusted Execution Technology,Hardware-based Technology for Enhancing Server Platform Security ,White Paper,Copyright © 2010 Intel Corporation, 8 pages.

U.S. Appl. No. 14/493,458, filed Sep. 23, 2014, R. Stephen Polzin.

Jim Alves-Foss; The MILS Architecture for High-Assurance Embedded Systems; International Journal of Embedded Systems, Feb. 2005; 1-9.

U.S. Appl. No. 13/626,566, filed Sep. 25, 2012, Manu Gulati.

Final Office Action from U.S. Appl. No. 13/626,566, filed Sep. 25, 2012, Manu Gulati.

Office Action from U.S. Appl. No. 13/626,476, filed Sep. 25, 2012, R. Stephen Polzin.

* cited by examiner

| Operation | Key | In | Count | Out |
|---|---|---|---|---|
| Gen Key A | UID2 | Seed A | 1 | GenID_2A |
| Gen Key B | UID2 | Seed B | 1 | GenID_2B |
| Gen Wrapping Key | GenID_2A | SKG Input | 1 | Wrapping Key |
| Gen New Key | GenID_2B | SKG Input | Reg | New Key |

SECURITY ENCLAVE PROCESSOR BOOT CONTROL

This application is a continuation of U.S. patent application Ser. No. 13/626,585, filed on Sep. 25, 2012 and now U.S. Pat. No. 9,047,471. The above application is incorporated herein by reference in its entirety.

BACKGROUND

1. Field of the Invention

This invention is related to the field of systems on a chip (SOCs), and more particularly to security on SOCs and devices that employ SOCs.

2. Description of the Related Art

As the number of transistors that can be incorporated on a single semiconductor substrate "chip" continues to increase, the variety and complexity of functionality on the chip continues to increase as well. One way in which the available transistors can be used is to form an SOC. The SOC generally includes one or more processors and various other components (e.g. one or more memory controllers, various peripheral components, etc.).

Because SOCs incorporate significant functionality in a small form factor, and because SOCs can be made power efficient, SOCs are a popular device to include in portable electronic devices such a portable phones (cell phones), smart phones, personal digital assistants (PDAs), tablet computers, etc. These portable electronic devices no have significant processing power and are increasingly being used for financial management and transaction, user communications other than voice (text, email, web browsing, etc.), streaming video, etc. Accordingly, SOCs may operate on private user data as well as data belonging to others (e.g. copyrighted audio, video, and still images). Accordingly, the security of the SOC and its ability to resist attacks meant to compromise secure data are becoming increasingly important features.

SUMMARY

An SOC that implements a security enclave processor (SEP) is described herein. The SEP may be an SOC within an SOC, in some embodiments, including a processor and one or more security peripherals. The SEP may be isolated from the rest of the SOC (e.g. one or more central processing units (CPUs) in the SOC, or application processors (APs) in the SOC). Access to the SEP may be strictly controlled by hardware. For example, a mechanism in which the CPUs/APs can only access a mailbox location in the SEP is described. The CPU/AP may write a message to the mailbox, which the SEP may read and respond to. All other access to the SEP may not be possible in a production part.

In an embodiment, the SEP may manage cryptographic keys for the rest of the SOC. In an embodiment, software executing on the SOC may request a key, and the SOC may provide a "wrapped" key to the requesting software. The wrapped key is encrypted using a wrapping key, which is transmitted in hardware to the cryptographic hardware in the SOC. Using the wrapping key, the receiving cryptographic hardware may decrypt the wrapped key provided by the software, obtaining the actual key that is to be used. Insecure software may not have access to the actual key.

In an embodiment, the SEP may be in control of its boot. Accordingly, the SEP may not be compromised by modifying its boot code. The boot code may be stored in a secure read-only memory (ROM) in the SEP. In an embodiment, all of the software executed by the SEP may be stored in the secure ROM. The secure ROM may be smaller than the boot ROM of the CPUs/APs in the SOC, and may be inaccessible outside of the SEP. The processor in the SEP may execute directly from the secure ROM, avoiding copy of the code to a modifiable memory such as random access memory (RAM). Thus, the "attack surface" presented by the SEP with the secure ROM may be relatively small compared to booting the CPUs/APs.

In an embodiment, the SEP may be in control of its power management features. The SEP may determine if it is to be clock gated or power gated, for example, and may request clock gating or power gating from a power manager in the SOC. However, clock gating/power gating may not be forced from the outside of the SEP (other than when the entire SOC is powered off). Thus, the SEP may be protected from attempts to power manage the SEP at inopportune times (e.g. in an attempt to compromise the SEP).

In an embodiment, the SOC may support a separate trust zone for the SEP (separate from the CPU trust zone). The CPU may access its own trust zone but not the SEP trust zone, and the SEP may access its own trust zone but not the CPU trust zone. Other components of the SOC may not access either trust zone. Accordingly, multiple tiers of trust and security may be available. Additionally, the SEP may have access to RAM memory (e.g. for state storage) without requiring the SEP to have a local RAM in the SEP.

BRIEF DESCRIPTION OF THE DRAWINGS

The following detailed description makes reference to the accompanying drawings, which are now briefly described.

Figure 1:
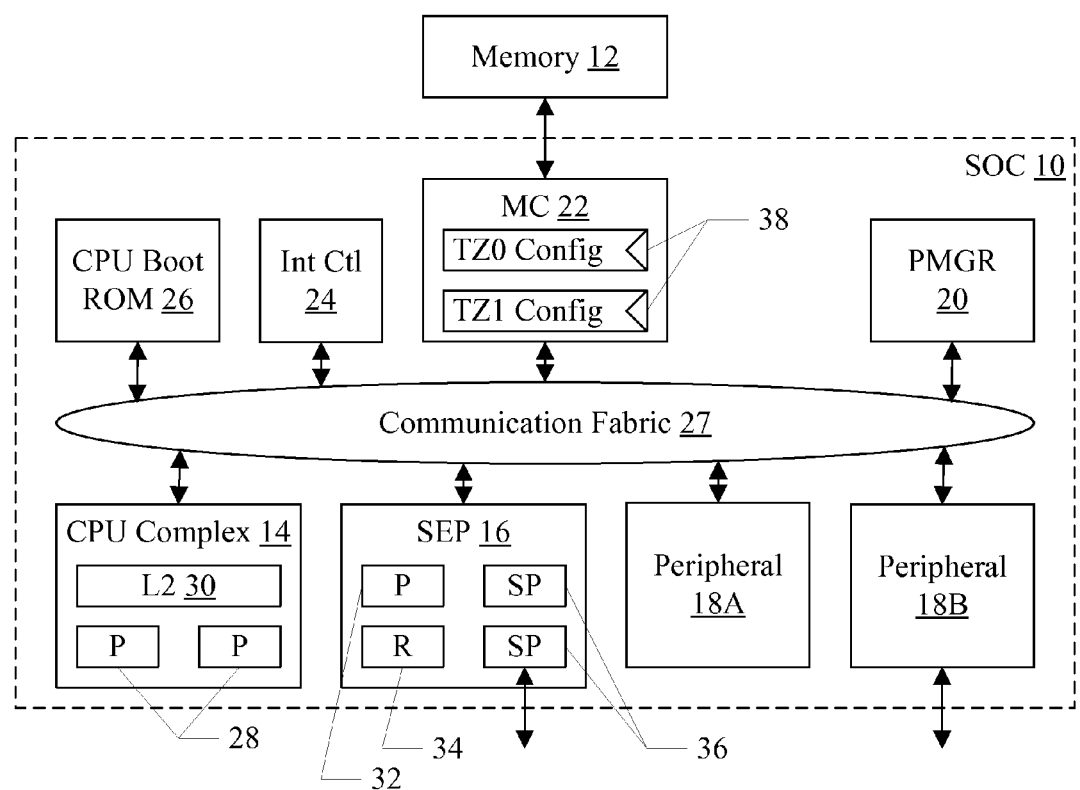
FIG. 1 is a block diagram of one embodiment of a system on a chip (SOC) including a security enclave processor (SEP).

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits and/or memory storing program instructions executable to implement the operation. The memory can include volatile memory such as static or dynamic random access memory and/or nonvolatile memory such as optical or magnetic disk storage, flash memory, programmable read-only memories, etc. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

DETAILED DESCRIPTION OF EMBODIMENTS

Turning now to FIG. 1, a block diagram of one embodiment of an SOC 10 is shown coupled to a memory 12. As implied by the name, the components of the SOC 10 may be integrated onto a single semiconductor substrate as a integrated circuit "chip." In some embodiments, the components may be implemented on two or more discrete chips in a system. However, the SOC 10 will be used as an example herein. In the illustrated embodiment, the components of the SOC 10 include a central processing unit (CPU) complex 14, a security enclave processor (SEP) 16, peripheral components 18A-18B (more briefly, "peripherals"), a power manager circuit (PMGR) 20, a memory controller 22, an interrupt controller 24, a CPU boot ROM 26, and a communication fabric 27. The components 14, 16, 18A-18B, 20, 22, 24, and 26 may all be coupled to the communication fabric 27. The memory controller 22 may be coupled to the memory 12 during use, and may include one or more configuration registers 38 in an embodiment. In the illustrated embodiment, the CPU complex 14 includes one or more processors 28 and a level two (L2) cache 30. In the illustrated embodiment, the SEP 16 includes one or more processors 32, a secure boot ROM 34, and one or more security peripherals 36. The processor(s) 28 may be referred to herein as CPU processor(s) 28, and the processor(s) 32 may be referred to herein as SEP processor(s) 32.

The SEP 16 is an example of a security circuit. Generally, a security circuit may be any circuitry that is configured to perform one or more secure services for the rest of the SOC 10 (e.g. the other components in the SOC 10). That is, a component may transmit a request for a secure service to the security circuit, which may perform the secure service and return a result to the requestor. The result may be an indication of success/failure of the request and/or may include data generated by performing the service. For example, secure services may include various cryptographic services such as authentication, encryption, decryption, etc. The result of authentication may be a pass/fail, for example. The result of encryption/decryption may be the encrypted/decrypted data. Secure services may include secure key generation, where the keys may be used by components external to the security circuit for various security functions such as encryption or authentication. The result of secure key generation may be the key, or a wrapped key as described in greater detail below for an embodiment.

Secure services may include any services related to ensuring the protection of private data and/or preventing the unauthorized use of the system including the SOC 10. Protecting private data may include preventing unauthorized access (e.g. theft of data) and/or preventing corruption/destruction of the data. Protecting private data may include ensuring the integrity and confidentiality of the data, and the availability of the data to authorized access. Preventing unauthorized use may include, e.g., ensuring that a permitted use is paid for (e.g. network access by a portable device) and may also include ensuring that nefarious acts are prevented. Nefarious acts may include, for example, use of a device to consume power from a battery of the device so that authorized use is curtailed due to a lack of power, acts to cause damage to the system or to another system that interacts with the system, use of the device to cause corruption of data/software, etc. Secure services may include ensuring that the use of the system is available to authorized users as well, and authenticating authorized users.

A security circuit may include any desired circuitry (e.g. cryptographic hardware, hardware that accelerates certain operations that are used in cryptographic functions, etc.). A security circuit need not include a processor. In some embodiments, e.g. the embodiment shown in FIG. 1, a processor is included. The SEP processor 32 may execute securely loaded software. For example, a secure read-only memory (ROM) 34 may include software executable by the SEP processor 32. One more of the security peripherals 36 may have an external interface, which may be connected to a source of software. The software from the source may be authenticated or otherwise verified as secure, and may be executable by the SEP processor 32. In some embodiments, software may be stored in a trust zone in the memory 12 that is assigned to the SEP 16 and the SEP processor 32 may fetch the software from the trust zone for execution.

The SEP 16 may be isolated from the rest of the SOC 10 except for a carefully-controlled interface (thus forming a secure enclave for the SEP processor 32, the secure boot ROM 34, and the security peripherals 36). Because the interface to the SEP 16 is carefully controlled, direct access to the SEP processor 32, the secure boot ROM 34, and the security peripherals 36 may be prevented. In one embodiment, a secure mailbox mechanism may be implemented. In the secure mailbox mechanism, external devices may transmit messages to an inbox. The SEP processor 32 may read and interpret the message, determining the actions to take in response to the message. Response messages from the SEP processor 32 may be transmitted through an outbox, which is also part of the secure mailbox mechanism. No other access from the external devices to the SEP 16 may be permitted.

The security peripherals 36 may be hardware configured to assist in the secure services performed by the SEP 16. For example, the security peripherals may include authentication hardware implementing various authentication algorithms, encryption hardware configured to perform encryption, secure interface controllers configured to communicate over a secure interface to an external (to the SOC 10) device, etc.

Thus, in the illustrated embodiment, the SEP 16 may be an SOC within an SOC. The SEP 16 may be relatively autonomous from the remainder of the SOC 10. While communication between the SEP 16 and the remainder of the SOC 10 is supported, the SEP 16 may execute independent of the SOC 10 and vice versa.

The CPU complex 14 may include one or more CPU processors 28 that serve as the CPU of the SOC 10. The CPU of the system includes the processor(s) that execute the main control software of the system, such as an operating system. Generally, software executed by the CPU during use may control the other components of the system to realize the desired functionality of the system (except that the operating system may not control the SEP 16). The CPU processors 28 may also execute other software, such as application programs. The application programs may provide user functionality, and may rely on the operating system for lower level device control. Accordingly, the CPU processors 28 may also be referred to as application processors. The CPU complex may further include other hardware such as the L2 cache 30 and/or and interface to the other components of the system (e.g. an interface to the communication fabric 27).

The peripherals 18A-18B may be any set of additional hardware functionality included in the SOC 10. For example, the peripherals 18A-18B may include video peripherals such as cameras, camera interfaces, image processors, video encoder/decoders, scalers, rotators, blenders, graphics processing units, display controllers, etc. The peripherals may include audio peripherals such as microphones, speakers, interfaces to microphones and speakers, audio processors, digital signal processors, mixers, etc. The peripherals may include interface controllers for various interfaces external to the SOC 10 (e.g. the peripheral 18B) including interfaces such as Universal Serial Bus (USB), peripheral component interconnect (PCI) including PCI Express (PCIe), serial and parallel ports, etc. The peripherals may include networking peripherals such as media access controllers (MACs). Any set of hardware may be included.

The PMGR 20 may manage power in the SOC 10, including clock gating and power gating techniques, for example. The PMGR 20 may monitor various activity levels in the SOC 10 to implement the power management schemes. The schemes may be driven by software, by hardware based on software-programmable configuration, or both.

The CPU boot ROM 26 may be a read-only memory (ROM) configured to store software code (instructions) to be executed by the CPU complex 14 (e.g. the CPU processors 28) to boot the SOC 10. The CPU boot ROM 26 may include instructions that interface with the SEP 16, but the SEP 16 may be booted using software in the secure ROM 34. In an embodiment, the secure ROM 34 may be smaller in size/storage than the CPU boot ROM 26, which may reduce the "attack surface" for nefarious actors attempting to compromise the SOC 10. Additionally, the CPU boot ROM 26 may be mapped into the memory address space that includes the memory 12. Accordingly, the CPU boot ROM 26 may be accessible by other components of the SOC 10. On the other hand, the secure ROM 34 may be accessible only within the SEP 16 (e.g. by the SEP processor 32). Components external to the SEP 16 may not have access to the secure ROM 34. Additional details for one embodiment of the boot ROMs 26 and 34 and the interaction of the SOC 10/SEP 16 during boot are provided below.

The memory controller 22 may generally include the circuitry for receiving memory requests from the other components of the SOC 10 and for accessing the memory 12 to complete the memory requests. The memory controller 22 may be configured to access any type of memory 12. For example, the memory 12 may be static random access memory (SRAM), dynamic RAM (DRAM) such as synchronous DRAM (SDRAM) including double data rate (DDR, DDR2, DDR3, etc.) DRAM. Low power/mobile versions of the DDR DRAM may be supported (e.g. LPDDR, mDDR, etc.). In the illustrated embodiment, the memory controller 22 may include configuration registers 38 to identify trust zones within the memory address space mapped to the memory 12. Additional details regarding trust zones will be presented further below.

The interrupt controller 24 may be configured to manage interrupts in the SOC 10. The peripherals 18A-18B, the SEP 16, and the PMGR 20 may be configured to transmit interrupts for the CPU processors 28. The interrupt controller 24 may be configured to receive the interrupts, record them, and present them to the CPU processors 28. The CPU complex 14 may be configured to signal interrupts (e.g. inter processor interrupts (IPIs)) through the interrupt controller 24 as well. In some embodiments, processors may be included in some of the peripherals 18A-18B, and the interrupts for those processors may be managed by the interrupt controller 24 as well. In an embodiment, the interrupt controller 24 may not interrupt the processor 32 in the SEP 16.

The communication fabric 27 may be any communication interconnect and protocol for communicating among the components of the SOC 10. The communication fabric 27 may be bus-based, including shared bus configurations, cross bar configurations, and hierarchical buses with bridges. The communication fabric 27 may also be packet-based, and may be hierarchical with bridges, cross bar, point-to-point, or other interconnects.

It is noted that the number of components of the SOC 10 (and the number of subcomponents for those shown in FIG. 1, such as within the CPU complex 14 and the SEP 16) may vary from embodiment to embodiment. There may be more or fewer of each component/subcomponent than the number shown in FIG. 1.

Figure 2:
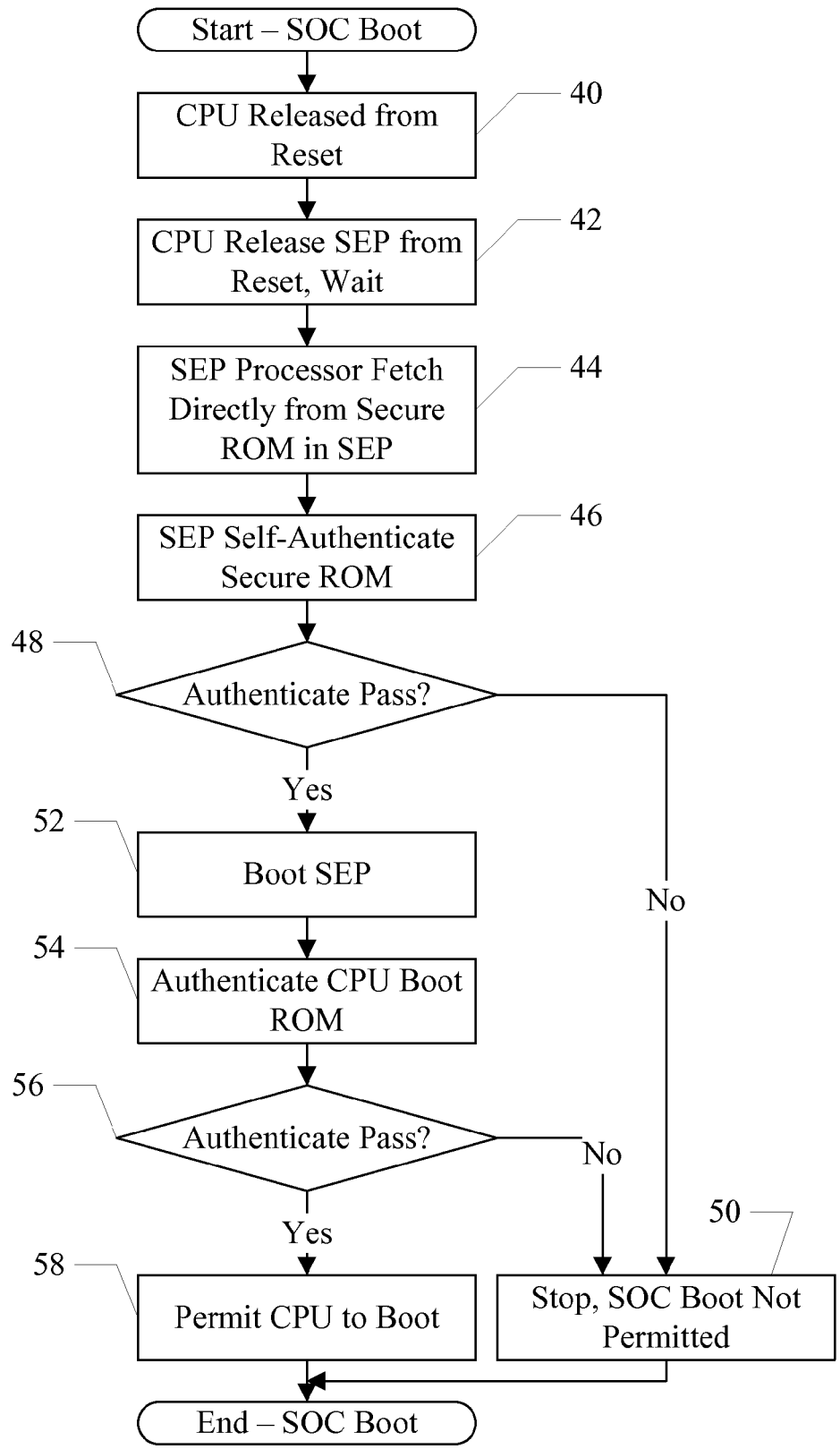
FIG. 2 is a flowchart illustrating one embodiment of booting the SOC under control of the SEP.

Turning now to FIG. 2, a flowchart is shown illustrating operation of one embodiment of the SOC 10 to boot (e.g. in response to powering up, a system reset, or other such event). While the blocks are shown in a particular order, other orders may be used. Blocks may be implemented in hardware, instructions executed in the processors 28 and/or 32, or a combination thereof.

Generally, when the boot process begins, reset may be asserted to the various processors in the SOC 10. The SOC 10 may have a reset input, for example, and the assertion of the reset signal on the reset input may cause the SOC 10 to go into reset. Reset control logic (e.g. in the PMGR 20) may maintain the assertion of reset until reset is released during the boot process. In this embodiment, one of the CPU processors 28 may be released from reset first (e.g. by the PMGR 20 circuitry), and may begin executing boot code (block 40). In an embodiment, the boot code may begin execution from the CPU boot ROM 26, but the contents of the CPU boot ROM 26 may be copied to the memory 12 and execution may continue from the memory 12 after the copy is performed. For example, the contents of the boot ROM 26 may be copied to the memory 12 after the memory controller 22 has been initialized and the contents of the boot ROM 26 have been authenticated as described below. Alternatively, the contents as written to the memory 12 may be authenticated. In other embodiments, the PMGR 20 may be configured to release the SEP processor 32 in the SEP 16 from reset first, and may boot the SEP 16 first. The SEP processor 32 may control the release of the CPU processors 28 in such embodiments, if desired. In still other embodiments, the reset of the CPU processors 28 and the SEP processor 32 may be independently released (that is, neither processor may control the release by the other processor).

In this embodiment, the CPU processor 28 may release the SEP processor 32 from reset (block 42) and may await permission from the SEP processor 32 to continue the boot process. The CPU processor 28 may release the SEP processor 32 from reset by writing a register in the reset control circuitry in the PMGR 20, for example. Other embodiments may release reset in other ways. While the CPU processor 28 may release the SEP processor 32 from reset, the CPU processor 28 may not be capable of causing the SEP processor 32 to enter reset. That is, the reset control circuitry may only cause the SEP processor 32 to enter reset in response to an assertion of reset on the reset pin to the SOC 10. These features may prevent nefarious software executing on the CPU processor 28 from forcing a reset of the SEP processor 32, which could impact the security/isolation of the SEP 16 from the reset of the CPU 10.

In response to being released from reset, the SEP processor 32 may begin fetching boot code directly from the secure boot ROM 34 (block 44). While the boot code may be cached in the SEP processor 32, in some embodiments, the boot code may not be written to a RAM or other modifiable memory. Even the instruction cache of the SEP processor 32 may be protected from software modification, since it is not generally software-accessible. In other embodiments, a secure RAM may be included in the SEP 16, if desired, and boot code may be copied to the secure RAM, if desired.

More particularly, the SEP processor 32 may be hardwired (e.g. in hardware, not programmable) to fetch directly from the secure ROM 34. Additionally, other controls that the SEP processor 32 may have (e.g. a run input which can be asserted to cause the SEP processor 32 to begin execution, separate from the reset input) may be hardwired so that that SEP processor 32 executes from the secure ROM 34 in response to being released from reset, without further input. In this manner, the SEP processor 32 may securely execute code. By hardwiring the SEP processor 32 to begin fetching direction from the secure ROM 34 and by ensuring that the secure code cannot be modified, the secure code may be tamper proof. Thus, the SEP processor 32 may not fetch code from outside the secure ROM 34 unless the secure code in the secure ROM 34 directs the SEP processor 32 to do so.

The SEP processor 32 may self-authenticate the contents of the secure ROM 34 (block 46). That is, the boot code from the secure ROM 34 may include instructions which, when executed by the SEP processor 32, authenticate the contents of the secure ROM 34. The instructions may perform the authentication directly. Alternatively, if the SEP 16 includes an authentication unit as one of the security peripherals 36, the instructions may invoke the authentication unit with parameters causing the authentication unit to read the secure ROM 34 and authenticate it. Other embodiments may not authenticate the secure ROM 34.

If the authentication fails (decision block 48, "no" leg), the SEP processor 32 may stop the boot process and may prevent the SOC 10 from booting (block 50). For example, the SEP processor 32 may not provide the CPU processor 28 with permission to boot, and thus the SOC 10 may remain in a pre-boot state. The reason for stopping (e.g. failure to authenticate the secure boot code) may be recorded in a register or memory 12 for debug purposes, in some embodiments.

If the authentication passes (decision block 48, "yes" leg), the SEP processor 32 may boot the SEP 16 (block 52). Generally, booting may refer to initializing the hardware, programming various programmable features, etc. in preparation for normal operation. The SEP processor 32 may also authenticate the CPU boot ROM 26, or its image in the memory 12 (block 54). If the authentication fails (decision block 56, "no" leg), the SEP processor 32 may again stop the boot process and may prevent the SOC 10 from booting (block 50). If the authentication passes, the SEP processor 32 may return permission to the CPU processor 28 to continue booting (block 58).

The communication requesting permission to boot and returning the permission to boot may occur via messages in the inbox and outbox of the SEP 16, in an embodiment. The secure mailbox mechanism is described in more detail below.

Figure 17:
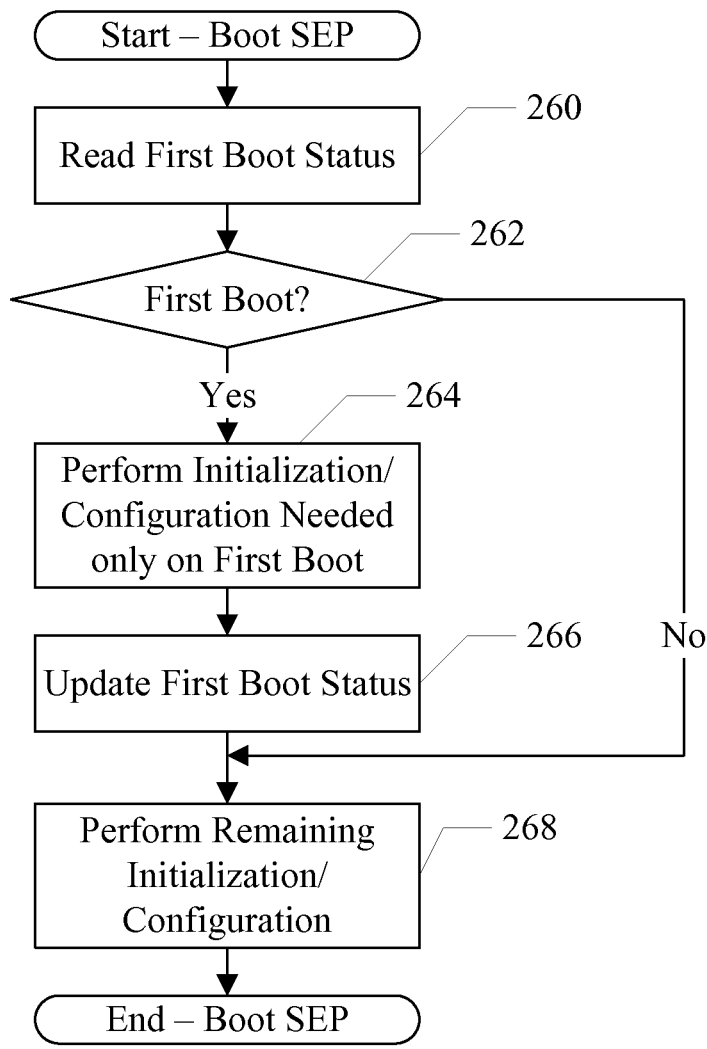
FIG. 17 is a flowchart illustrating one embodiment of booting the SEP in greater detail.

In one embodiment, booting the SEP (block 52) may involve different operation on the first boot after power on reset as compared to operation during boot after other resets that may occur during operation ("warm resets"). Particularly, there may be some initialization of hardware and/or programmable configuration that may only be required at the first boot, and need not be repeated in subsequent boots. FIG. 17 is a flowchart illustrating such an implementation of block 52. While the blocks are shown in a particular order, other orders may be used. Blocks may be implemented in instructions stored in the secure ROM 34 and executed in the processor 32, for example.

The SEP 16 may read a first boot status (block 260). The first boot status may indicate whether or not this is the first boot after a power on reset. The first boot status may be stored in a register within the SOC 10, for example, if the register is initialized by hardware in response to a power on reset but not in response to warm resets. The first boot status may be stored in non-volatile memory, or may be stored in the trust zone portion of the memory 12 that is assigned to the SEP 16 in embodiments that implement the trust zone. The trust zone storage may be used, e.g., if the trust zone configuration is retained by the memory controller 22 across warm resets.

If the first boot status indicates that this is the first boot (decision block 262, "yes" leg), the SEP 16 may perform initialization/configuration that is needed only on the first boot (block 264). For example, such initialization/configuration may include initializations of circuitry outside of the SEP 16. Such initialization may also include initializations of circuitry in "always on" power domains within the SEP 16 (circuitry which is powered whenever the SOC 10 is powered, even if the SEP 16 is powered down). Any subset of initialization/configuration may be used in various embodiments. The SEP 16 may also update the first boot status (block 266) to a state indicating not first boot. The SEP 16 may perform remaining initialization/configuration (block 268). The remaining initialization/configuration may be initialization/configuration performed on each boot. Since the SEP 16 may be power managed, such initialization/configuration may include initialization/configuration within the SEP 16 (except for any "always on" sections, for example).

If the first boot status indicates not first boot (decision block 262, "no" leg), blocks 264 and 266 may be skipped by block 268 may still be performed.

Figure 3:
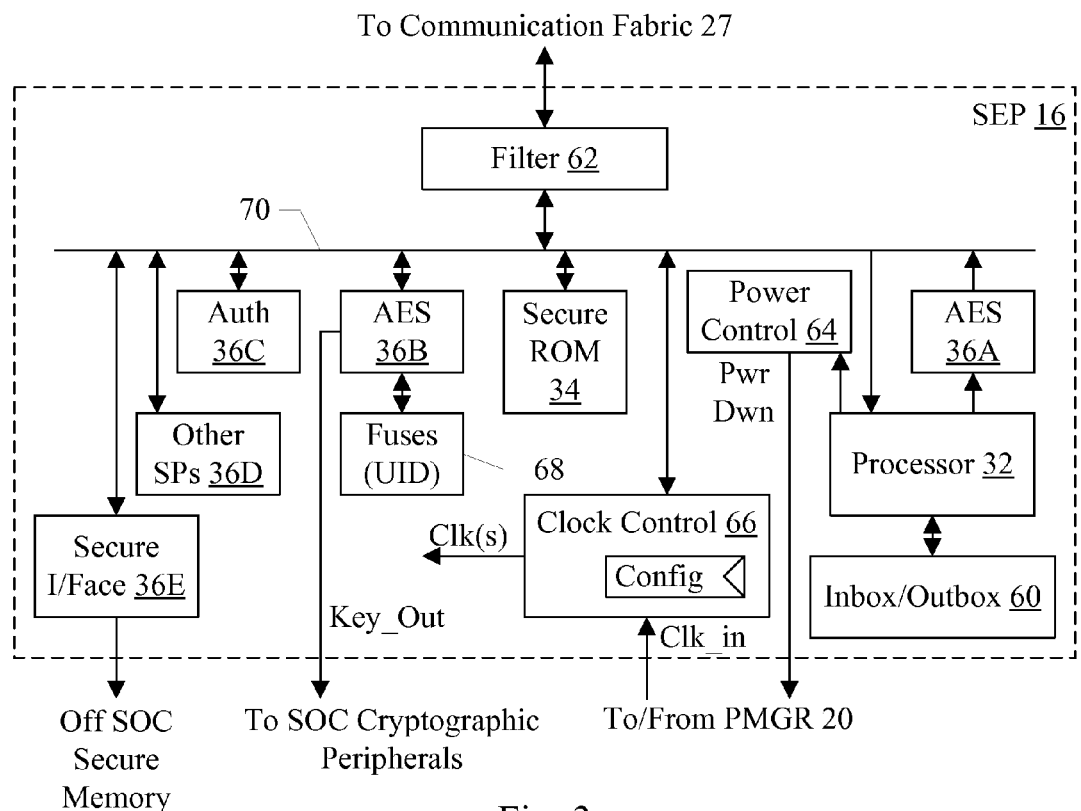
FIG. 3 is a block diagram of one embodiment of the SEP shown in FIG. 1 in greater detail.

Turning now to FIG. 3, a block diagram of one embodiment of the SEP 16 in greater detail is shown. In the illustrated embodiment, the SEP 16 includes the SEP processor 32, security peripherals 36A-36E, the secure ROM 34, secure mailbox 60, filter 62, power control unit 64, clock control unit 66, and fuses 68. The filter 62 may be coupled to the communication fabric 27 and to a local interconnect 70 to which the other components of the SEP 16 are also coupled. Like the communication fabric 27, the local interconnect 70 may have any configuration (bus-based, packet-based, hierarchical, point-to-point, cross bar, etc.). The security peripheral 36B may be coupled to the fuses 68. The security peripheral 36A may be coupled to the SEP processor 32, which may also be coupled to the secure mailbox 60 and the power control unit 64. The power control unit 64 may be coupled to the clock control unit 66 and the PMGR 20. The clock control unit 66 may also be coupled to the PMGR 20, and to provide clocks to the other components of the SEP 16.

The filter 62 may be configured to tightly control access to the SEP 16 to increase the isolation of the SEP 16 from the rest of the SOC 10, and thus the overall security of the SOC 10. More particularly, in an embodiment, the filter 62 may permit read/write operations from the communication fabric 27 to enter the SEP 16 only if the operations address the secure mailbox 60. Other operations may not progress from the fabric 27 into the SEP 16. Even more particularly, the filter 62 may permit write operations to the address assigned to the inbox portion of the secure mailbox 60, and read operations to the address assigned to the outbox portion of the secure mailbox 60. All other read/write operations may be prevented by the filter 62. In an embodiment, the filter 62 may respond to other read/write operations with an error. In an embodiment, the filter 62 may sink write data associated with a filtered write operation without passing the write data on to the local interconnect 70. In an embodiment, the filter 62 may supply nonce data as read data for a filtered read operation. Nonce data may generally be data that is not associated with the addressed resource within the SEP 16. Nonce data is sometimes referred to as "garbage data." The filter 62 may supply any data as nonce data (e.g. all zeros, all ones, random data from a random number generator, data programmed into the filter 62 to respond as read data, the address of the read transaction, etc.).

In an embodiment, the filter 62 may only filter incoming read/write operations. Thus, the components of the SEP 16 may have full access to the other components of the SOC 10 and the memory 12 (except for the portion of the memory 12 assigned as the trust zone for the CPU complex 14, in an embodiment that implements trust zones). Accordingly, the filter 62 may not filter responses from the fabric 27 that are provided in response to read/write operations issued by the SEP 16.

The secure mailbox 60 may include an inbox and an outbox. Both the inbox and the outbox may be first-in, first-out buffers (FIFOs) for data. The buffers may have any size (e.g. any number of entries, where each entry is capable of storing data from a read/write operation). Particularly, the inbox may be configured to store write data from write operations sourced from the fabric 27 (e.g. issued by one of the CPU processors 28). The outbox may store write data from write operations sourced by the processor 32 (which may be read by read operations sourced from the fabric 27, e.g. read operations issued by one of the CPU processors 28).

In one embodiment, write data for write operations generated by the SEP processor 32 that are to be transmitted by the SEP 16 on the fabric 27 may optionally be encrypted. The security peripheral 36A may by an encryption circuit configured to encrypt the write data as it is provided by the processor to be transmitted on the fabric 27. An attribute of the write operation issued by the SEP processor 32 may indicate whether or not the data is to be encrypted. The attribute may be a packet field, in packet-based embodiments, a signal transmitted with the write operation, in bus-based embodiments, or may be transmitted in any other desired fashion. In the illustrated embodiment, the encryption circuit 36A may implement encryption that is compatible with the Advanced Encryption Standard (AES). However, other embodiments may implement any encryption algorithm.

While the encryption circuit 36A is shown inline between the SEP processor 32 and the local interconnect 70, the encryption circuit 36A may actually be coupled in parallel with the processor to the local interconnect 70. The encryption circuit 36A may capture the write data (and the filter circuit 62 may ignore the write data) from the SEP processor 32 on the local interconnect 70 responsive to the encryption attribute indicating encryption, and the encryption circuit 36A may encrypt the write data and supply the encrypted write data on the local interconnect 70 to the filter 62 (which may relay the encrypted write data on the communication fabric 27 as the data for the write operation).

The power control unit 64 may be configured to control the power gating of the SEP 16. The power control unit 64 may be coupled to the SEP processor 32, and may monitor the processor to determine when power gating is to be requested. Responsive to determining that power gating is to be requested, the power control unit 64 may transmit a power gating request (Pwr Dwn in FIG. 3) to the PMGR 20. The PMGR 20 may determine that the SEP 16 is to be powered gated, and may power gate the SEP 16. However, the PMGR 20 may not be capable of power gating the SEP 16 without a request from the SEP 16.

In some embodiments, the power control unit 64 may also be configured to control clock gating in the SEP 16. Alternatively, the clock control unit 66 may be configured to control the clock gating in the SEP 16. Clock gating may be controlled locally, or may be requested from the PMGR 20, in various embodiments. Additional details of one embodiment of power gating and clock gating in the SEP 16 are discussed further below.

The clock control unit 66 may be configured to control the local clocks in the SEP 16. The clock control unit 66 may be coupled to receive an input clock from the PMGR 20, and may generate the clocks local to the SEP 16. The clock control unit 66 may be programmable (e.g. by the SEP processor 32) with clock ratios, clock enables, clock gating enables, etc. for the various clocks in the SEP 16. In an embodiment, the clock from the PMGR 20 is free-running (not clock-gated external to the SEP 16).

The secure ROM 34 is coupled to the local interconnect 70, and may respond to an address range assigned to the secure ROM 34 on the local interconnect 70. The address range may be hardwired, and the processor 32 may be hardwired to fetch from the address range at boot in order to boot from the secure ROM 34. The filter 62 may filter addresses within the address range assigned to the secure ROM 34 (as mentioned above), preventing access to the secure ROM 34 from external to the SEP 16. As mentioned previously, the secure ROM 34 may include the boot code for the SEP 16. Additionally, in some embodiments, the secure ROM 34 may include other software executed by the SEP processor 32 during use (e.g. the code to process inbox messages and generate outbox messages, code to interface to the security peripherals 36A-36E, etc.). In an embodiment, the secure ROM 34 may store all the code that is executed by the SEP processor 32 during use.

A second encryption circuit 36B is included as a security peripheral, in this embodiment. The second encryption circuit 36B may also implement AES, or any other encryption algorithm. In an embodiment, the second encryption circuit 36B may be responsible for secure key generation. In such an embodiment, the second encryption circuit 36B may be configured to output a key in hardware (e.g. dedicated wires) to cryptographic circuits and/or other circuitry within SOC 10 and external to the SEP 16 which may use keys. The output key may be a wrapping key in some embodiments, which may be used to encrypt a secure key. The encrypted key may be provided to software, preventing the actual secure key from being exposed to software. The software may provide the encrypted key to the SOC cryptographic unit, which may decrypt the key using the wrapping key to obtain the secure key. The secure key may then be used for other encryption/decryption operations in the SOC cryptographic unit. Additional details will be provided further below.

The second encryption circuit 36B is shown in the embodiment of FIG. 3 coupled to a set of fuses 68. The fuses 68 may be any mechanism that may fix values in hardware at the time of manufacture. For example, fuses may be selectively blown by laser or electrical activity during manufacture. A blown fuse may provide a binary one, and an unblown fuse may provide a binary zero, or vice versa. By selectively blowing multiple fuses, a multi-bit binary value may be generated.

More particularly, the fuses 68 may be blown to create a unique identifier (UID) to this instance of the SOC 10. That is, each instance of the SOC 10 may have the fuses blown in a different way so that the UID is different for each instance. Thus, the UID is an instance-specific value. If the UID is used in generation of keys, those keys will be different than keys generated on another instance even if the other data used to generate the keys is the same between instances. The encryption circuit 36B may further include seeds that may be used with the UID to generate keys. The seeds may be the same for each instance of the SOC 10. That is, the seeds may be instance-invariant. In an embodiment, two UIDs may be provided from the fuses 68. More or fewer UIDs may be provided from the fuses 68 in other embodiments.

An authentication circuit 36C may be another example of a security peripheral. The authentication circuit 36C may implement an authentication algorithm. For example, the authentication circuit 36C may implement secure hash algorithms (SHA) such as SHA-1 or SHA-2, or any other authentication algorithms. There may be various other security peripherals 36D.

In addition to security peripherals designed to perform specific functions, there may also be security peripherals that are interface units for secure interfaces such as the secure interface unit 36E. In the illustrated embodiment, the secure interface unit 36E may be an interface to an off SOC 10 ("off-chip") secure memory. For example, the interface may an interface to an off SOC Smart Card.

The security peripherals 38B-38E may have programming interfaces, which may be used by the SEP processor 32 (and more particularly by software executing on the SEP processor 32) to invoke the security peripherals 38B-38E to perform a particular task. For example, the peripherals may include register that may be read and written to control operation of the security peripherals. The peripherals may include a command interface that receives and interprets write operations as commands to be performed. Any interface for invoking the security peripherals may be used.

Figure 4:
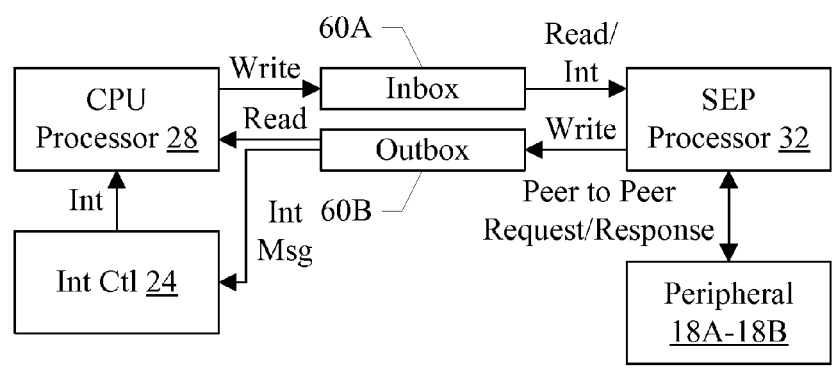
FIG. 4 is a block diagram illustrating one embodiment of a secure communication mechanism between the SEP and the other parts of the SOC.

Turning now to FIG. 4, a block diagram is shown illustrating operation of the secure mailbox 60 for one embodiment. The secure mailbox 60 is illustrated as the inbox 60A and the outbox 60B for this embodiment.

The CPU processor 28 may initiate a request for a security service by writing a message to the inbox 60A. The CPU processor 28 may transmit one or more write operations to address to the inbox 60A. The data from the write operations may be the message, requesting the desired security service and providing any parameters that might be needed. For example, the CPU processor 28 may provide an initial vector for a secure key generation. In response to the write to the inbox 60A, an interrupt may be signalled to the SEP processor 32. The interrupt may be sourced by the circuitry associated with the inbox 60A, or may be sourced by the filter 62 in response to passing the write operation from the communication fabric 27 to the inbox 60A. The SEP processor 32 may read the message from the inbox 60A in response to the interrupt, and may perform the requested service. The SEP processor 32 may invoke one or more security peripherals 36B-36E to perform the service, as desired. The SEP processor 32 may write the result of the service as a message to the outbox 60B. In response to the write to the outbox 60B, and interrupt message may be transmitted to the interrupt controller 24, which may interrupt the CPU processor 28. The CPU processor 28 may read the message from the output 60B, using one or more read operations addressed to the outbox 60B.

The SEP processor 32 may also generate communications to peripherals 18A-18B, the interrupt controller 24, the PMGR 20, or the memory controller 22 (to read/write the memory 12). Communications to the peripherals 18A-18B, the interrupt controller 24, and the PMGR 20 may be peer-to-peer requests and responses, wherein the requests are issued by the SEP processor 32 and the responses are returned by the component to the SEP 16. The components in the SOC 10 may not issue requests to the SEP 16, and will be filtered by the filter 62. Instead, if the components have a need to issue a request to the SEP 16, the component may write the inbox 60A. For memory operations, the SEP processor 32 may issue memory read/write operations with addresses mapped to the memory 12.

Figure 5:
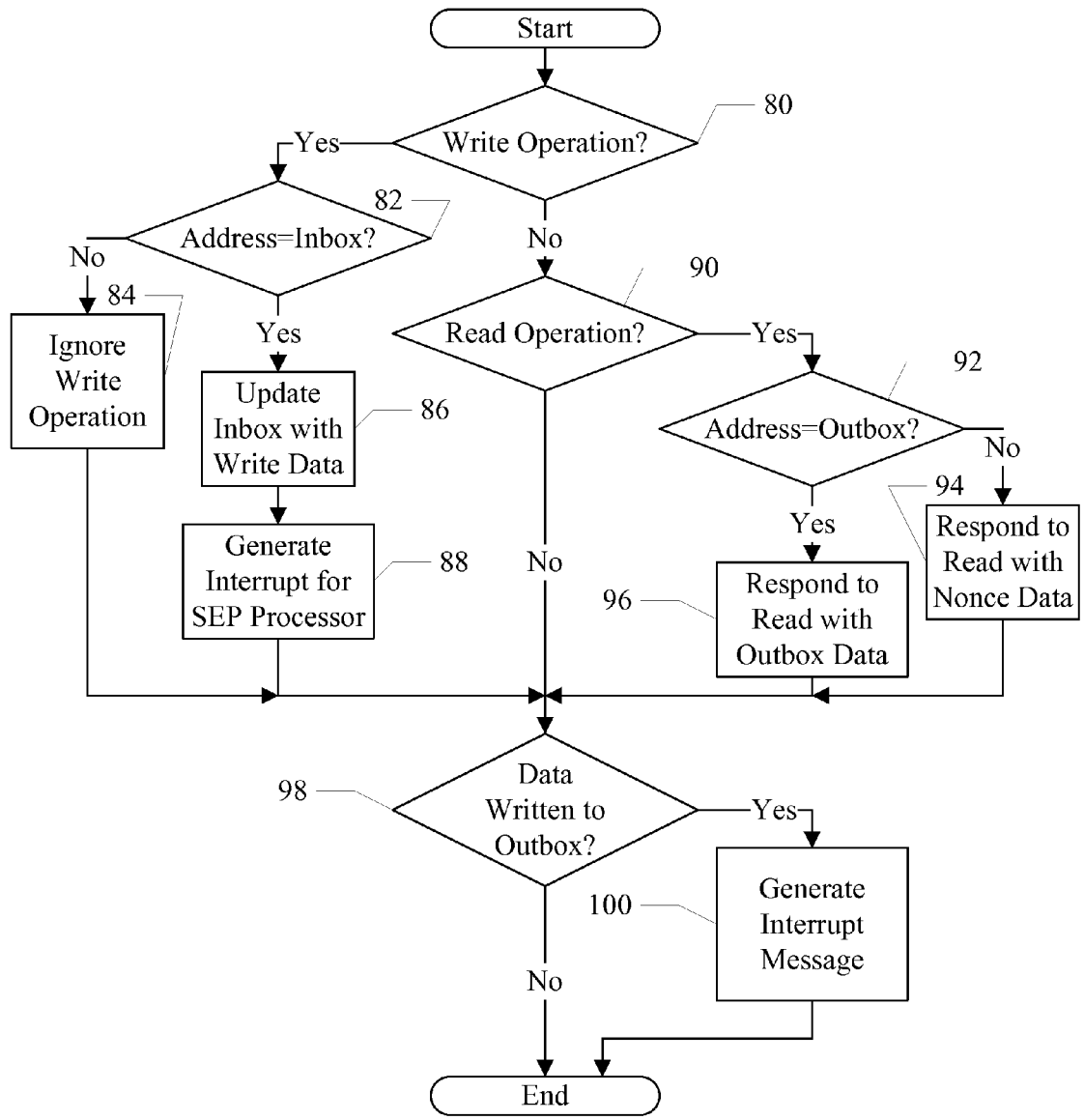
FIG. 5 is a flowchart illustrating operation of one embodiment of a filter shown in FIG. 3.

FIG. 5 is a flowchart illustrating operation of one embodiment of the filter 62. While the blocks are shown in a particular order for ease of understanding, other orders may be used. Blocks may be performed in parallel in combinatorial logic in the filter 62. Blocks, combinations of blocks, and/or the flowchart as a whole may be pipelined over multiple clock cycles.

If the filter 62 detects a write operation on the fabric 27 that is addressed to the range of addresses assigned to the SEP 16 (decision block 80, "yes" leg), and the address is not the address of the inbox (decision block 82, "no" leg), the filter 62 may ignore the write operation (block 84). Ignoring the write operation may include dropping both the write address and the write data, not forwarding the operation or its data to the local interconnect 70. The filter 62 may also respond to the write operation on the fabric 27 with an error. On the other hand, if the write operation is addressed to the inbox (decision blocks 80 and 82, "yes" legs), the filter 62 may pass the write operation on the local interconnect 70 to update the inbox (block 86). The filter 62 may also generate an interrupt to the SEP processor 32 to cause the SEP processor 32 to read the inbox (block 88).

If the filter 62 detects a read operation on the fabric 27 that is addressed to the range of addresses assigned to the SEP 16 (decision block 90, "yes" leg), and the address is not the address of the outbox (decision block 92, "no" leg), the filter 62 may respond to the read operation with nonce data (not forwarding the operation to the local interconnect 70—block 94). The filter 62 may also respond to the read operation on the fabric 27 with an error. On the other hand, if the read operation is addressed to the outbox (decision blocks 90 and 92, "yes" legs), the filter 62 may pass the read operation on the local interconnect 70 to read the outbox (block 96).

The filter 62 may also monitor the outbox to detect a write of data to the outbox by the SEP processor 32 (decision block 98). Alternatively, the SEP processor 32 may be configured to inform the filter 62 (e.g. with a sideband signal) that a write to the outbox is occurring. Responsive to detect that a write to the outbox has occurred (decision block 98, "yes" leg), the filter 62 may be configured to generate an interrupt message to the interrupt controller 24 to interrupt the CPU processor 28. The interrupt message may be transmitted on the fabric 27 to the interrupt controller 24.

Figure 6:
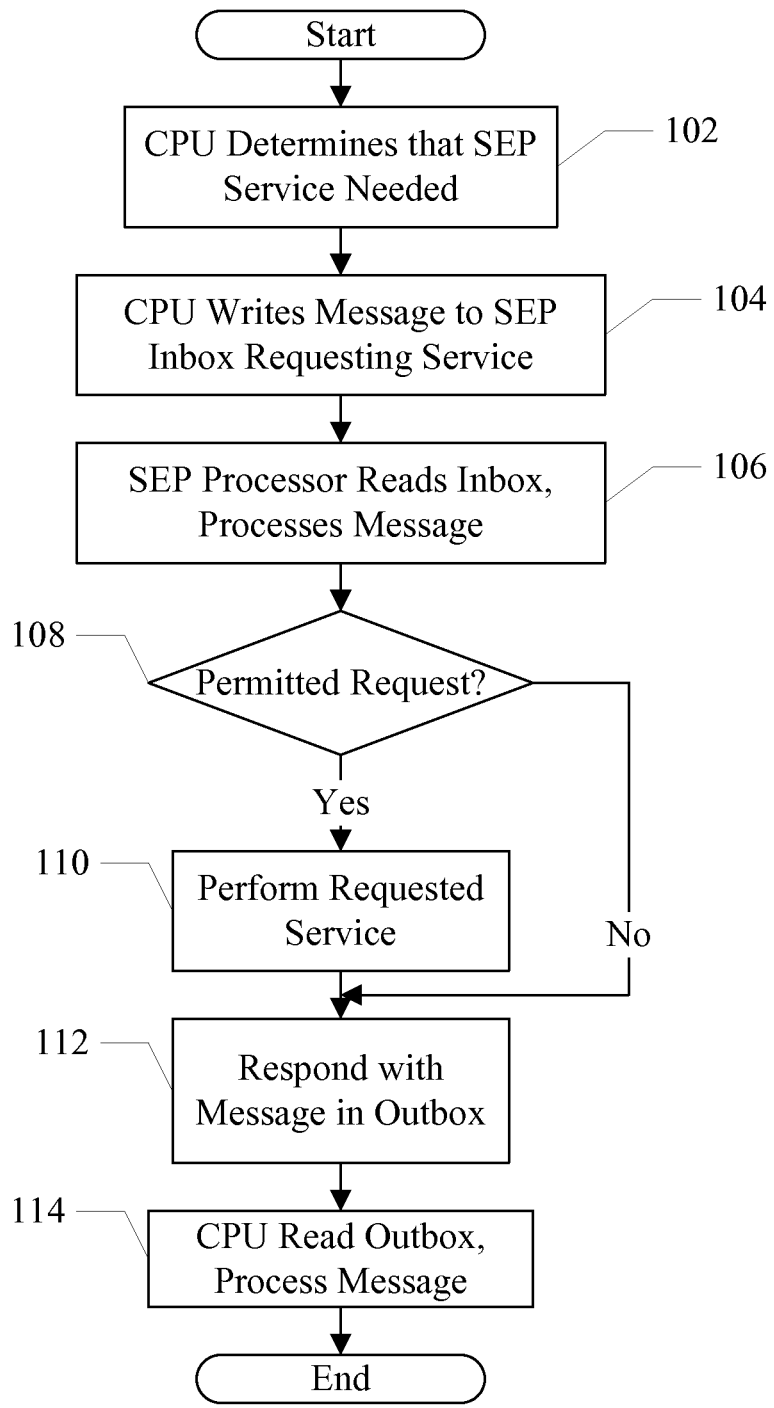
FIG. 6 is a flowchart illustrating operation of one embodiment of message passing through the inbox/outbox mechanism.

FIG. 6 is a flowchart illustrating the process of communicating between the SEP processor 32 and the CPU processor 28. The secure ROM 34 may store instructions which, when executed by the SEP processor 32, implement the operation shown in FIG. 6 for the SEP processor 32. The CPU boot ROM 26 may store the instructions which, when executed by the CPU processor 28, implement the operation shown in FIG. 6 for the CPU processor 28. While the blocks are shown in a particular order for ease of understanding, other orders may be used. The blocks performed by the CPU processor 28 and the blocks performed by the SEP processor 32 may be performed somewhat in parallel as well.

The CPU processor 28, executing various software, may determine that a security service is needed that the SEP 16 may perform (block 102). The CPU processor 28 may generate a message requesting the service, including any parameters needed by the service. For example, a key generation may include the initial vector to generate the key. An encryption may include the key t use for the encryption (or an initial vector to generate the key), and a pointer to a memory location at which the data to be encrypted is stored. An authentication may include a pointer to the memory location at which the data to be authenticated is stored. The CPU processor 28 may generate write operations to write the message to the SEP inbox (block 104). The SEP processor 32 may read the inbox (responsive to the interrupt generated by the filter 62, by generating read operations to read the inbox 60B) and may process the message (block 106). The SEP processor 32 may detect whether or not the request is a permitted request (e.g. the request is formatted properly, it is a service the SEP 16 performs, the parameters are correct, etc.) (decision block 108). If the request is a permitted request (decision block 108, "yes" leg), the SEP processor 32 may perform the requested service (block 110). Performing the requested service may include invoking various security peripherals 36 as needed, executing software to perform the requested service, or a combination thereof. The SEP processor 32 may respond to the request with a message in the outbox (block 112). That is, the SEP processor 32 may generate one or more write operations to write the message to the outbox 60B. If the request is not permitted (decision block 108, "no" leg), the response may be an error message. If the request is permitted, the response may indicate success or failure, may return a result, may include a pointer to a result in memory 12, etc. The CPU processor 28 (responsive to an interrupt transmitted by the interrupt controller 24 in response to an interrupt message from the SEP 16) may read the outbox 60B and process the message (block 114). That is, the CPU processor 28 may generate one or more read operations to read the outbox 60 to read the message.

In the embodiment of FIG. 3, the SEP 16 does not include local volatile memory (e.g. RAM). To provide RAM access for the SEP 16, a section of the memory 12 may be established as a trust zone for the SEP 16 (the "SEP trust zone"). Trust zone memory may be restricted-access memory. Only a memory operation having a trust zone memory attribute identifying the corresponding trust zone may be permitted to proceed. The hardware in the SOC 10 may be configured to ensure that only the SEP 16 may provide the trust zone memory attribute identifying the SEP trust zone. Thus, the SEP trust zone may be a secure area of memory that is only accessible to the SEP 16, providing modifiable storage for the SEP 16 that is secure. Other embodiments may implement local modifiable memory in addition to the SEP trust zone, or instead of the SEP trust zone.

In an embodiment, the CPU processors 28 may also have a trust zone in the memory 12 (the "CPU trust zone"). The CPU processors 28 may access the CPU trust zone, but not the SEP trust zone. Similarly, the SEP 16 (and more particularly the SEP processor 32) may access the SEP trust zone but not the CPU trust zone. In embodiments in which there is more than one CPU processor 28, only one CPU processor 28 may have access to the CPU trust zone or any of the CPU processors 28 may have access to the CPU trust zone. Similarly, in embodiments in which there is more than one SEP processor 32, only one of the SEP processors 32 may have access to the SEP trust zone or any of the SEP processors 32 may have access to the SEP trust zone. The SEP trust zone may also be referred to as trust zone zero (TZ0) and the CPU trust zone may also be referred to as trust zone one (TZ1).

Figure 7:
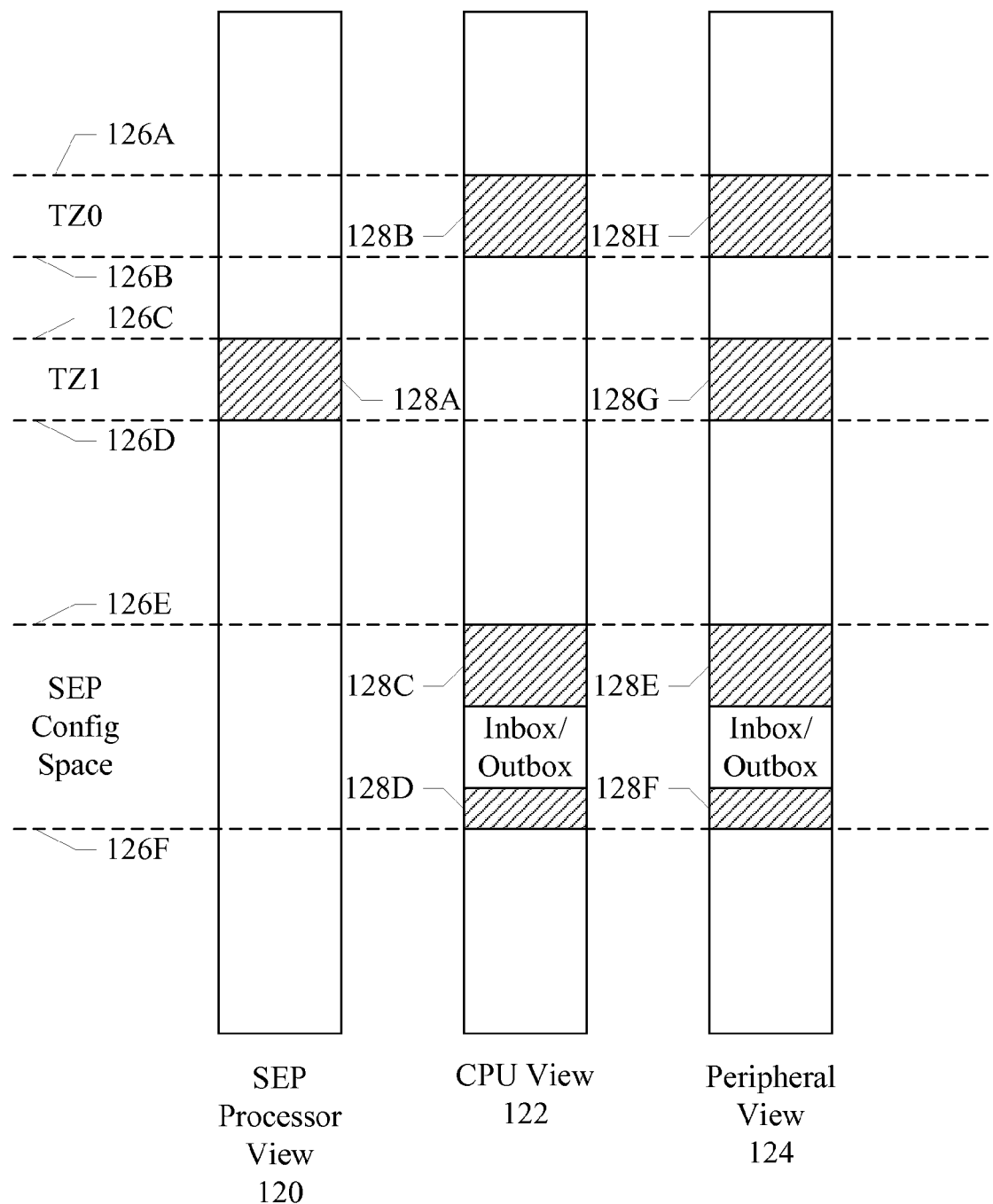
FIG. 7 is a diagram illustrating one embodiment of a memory address space and views thereof from the SEP, the CPU, and other peripherals.

Turning now to FIG. 7, a diagram of the memory address space in the SOC 10 is shown for one embodiment. There are three views of the memory address space shown: The SEP processor 32 view 120, the CPU processor 28 view 122, and the peripheral view 124. The memory address space may include the addresses assigned to the memory 12, and may in some embodiments also include memory-mapped spaces for various other components (e.g. an SEP configuration space is shown in FIG. 7). For each view 120, 122, or 124, cross-hatched areas indicate memory addresses to which the corresponding component does not have access. For example, the memory controller 22 may respond to memory operations having addresses in the cross-hatched areas with an error, or may complete the memory operations by dropping (discarding) write data and returning nonce data for reads, or both.

Within the portion of the address space assigned to the memory 12, the TZ0 address space is defined (between dotted lines 126A and 126B in FIG. 7) and the TZ1 address space is defined (between dotted lines 126C and 126D in FIG. 7). The SEP configuration space is also defined within the address space (between dotted lines 126E and 126F in FIG. 7). The locations of the TZ0, TZ1, and SEP configuration spaces may vary in various embodiments, and may be programmable as desired.

The SEP processor 32 may have access to the entirety of the address space except for the TZ1 space (cross-hatched area 128A). The CPU processor 28 may have access to the entirety of the space except for the TZ0 address space (cross-hatched area 128B) and the SEP configuration space (cross-hatched areas 128C and 128D). Within the SEP configuration space, the exception may be the addresses assigned to the secure mailbox 60 (i.e. the inbox and outbox), to which the CPU processor 28 does have access. The areas of the SEP configuration space that are cross-hatched may be addresses that map to the secure ROM 34 and the security peripherals 36, for example.

Similarly, the peripherals and other components in the SOC 10 may not have access to the SEP configuration space (cross-hatched areas 128E and 128F), except for the secure mailbox 60. The peripherals/other components may also not have access to either trust zone (cross-hatched areas 128G and 128H).

It is noted that, while two trust zones are shown in this embodiment, other embodiments may implement additional trust zones, if desired.

Figure 8:
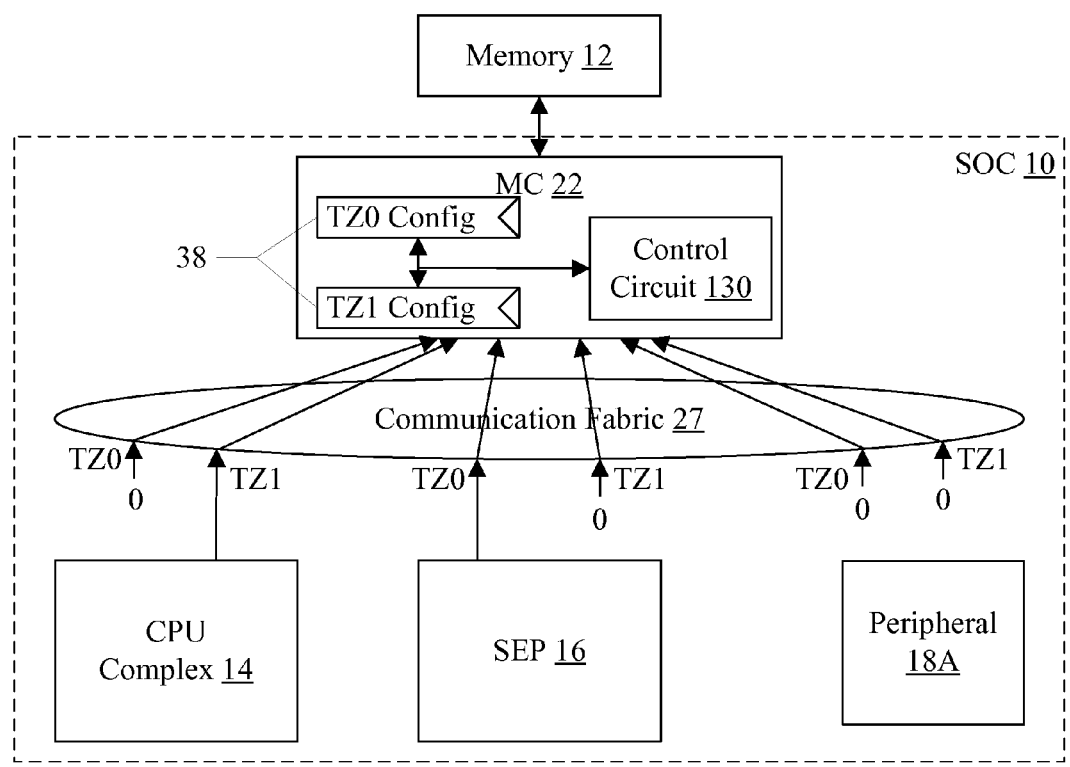
FIG. 8 is a block diagram illustrating one embodiment transmission of trust zone attributes with requests in the SOC.

Turning now to FIG. 8, a block diagram of a portion of the SOC 10 and the memory 12 is shown for one embodiment. Illustrated in FIG. 8 are the memory controller 22, including the configuration registers 38 and a control circuit 130 coupled to the configuration registers 38. Also illustrated in FIG. 8 are the communication fabric 27, the CPU complex 14, the SEP 16, and the peripheral 18A.

FIG. 8 illustrates one embodiment of the hardware in the SOC 10 ensuring that the trust zone attributes of the memory operations can only be provided from the correct requestors (the CPU complex 14 and the SEP 16, respectively, in this embodiment). The attributes for TZ0 and TZ1 are shown as TZ0 and TZ1 connections from each memory operation source onto the fabric 27. The attributes may be transmitted in different fashions depending on how the fabric 27 is constructed. For example, in a bus-based embodiment, the TZ0 and TZ1 connections may be attribute signals that are part of the address portion of the bus. The signals may be hardwired to the correct state for components that are not permitted to access the trust zones. In a packet-based embodiment, the TZ0 and TZ1 attributes may be included in the header of the packet (along with the memory operation command, address, etc.). In such an embodiment, the packet generation hardware provided at the interface of each component to the fabric 27 may ensure that the TZ0 and TZ1 attributes are provided correctly. That is, the packet generation hardware may force the TZ0 and TZ1 attributes to the correct state in the packet headers for components that are not permitted to access the trust zones.

In the illustrated embodiments, the trust zone attributes may each be a bit which may be set to indicate trust zone access and clear to indicate no trust zone access. Such an embodiment is illustrated in FIG. 8 with TZ0/TZ1 attributes either forced to zero or passing through the value provided by the corresponding component. Thus, the TZ0 attribute may be forced to zero from the CPU complex 14, and the TZ1 attribute may be passed through from the CPU complex 14 over the fabric 27 to the memory controller 22. The TZ1 attribute from the SEP 16 may be forced to zero, and the TZ0 attribute may be passed through from the SEP 16 over the fabric 27 to the memory controller 22. Both the TZ0 and TZ1 attributes may be forced to zero from the peripheral 18A (and similarly any other components in the SOC 10 may have both the TZ0 and TZ1 attributes forced to zero). Other embodiments may use the opposite binary states for the meanings of the TZ0/TZ1 attributes, or any other encoding.

The communication fabric 27 may be designed to pass along the TZ0 and TZ1 attributes of memory operation as issued by the memory operation source (and as forced to zero, if applicable, as shown in FIG. 8). No modification of the TZ0 and TZ1 attributes may be permitted or performed by the circuitry within the fabric 27. By way of contrast, in some embodiments, the priority of various memory operations may be modified by the fabric 27.

The memory controller 22 (and more particularly the control circuit 130) may be configured to manage access to the trust zones responsive to the data written in the configuration registers 38. The data may describe the size and location of the trust zones (e.g. using a base address and size, or limit, or a base address and ending address). The registers 38 may be write-once registers. That is, the memory controller 22 may accept a single write to each register 38 after power up/reset, and the trust zones may be defined based on those single writes. Once the writes have occurred, the registers may not be updated again until the SOC 10 is powered down and powered up again, or completely reset, such that the contents in the memory 12 (and particularly within the trust zones) has been erased.

Figure 9:
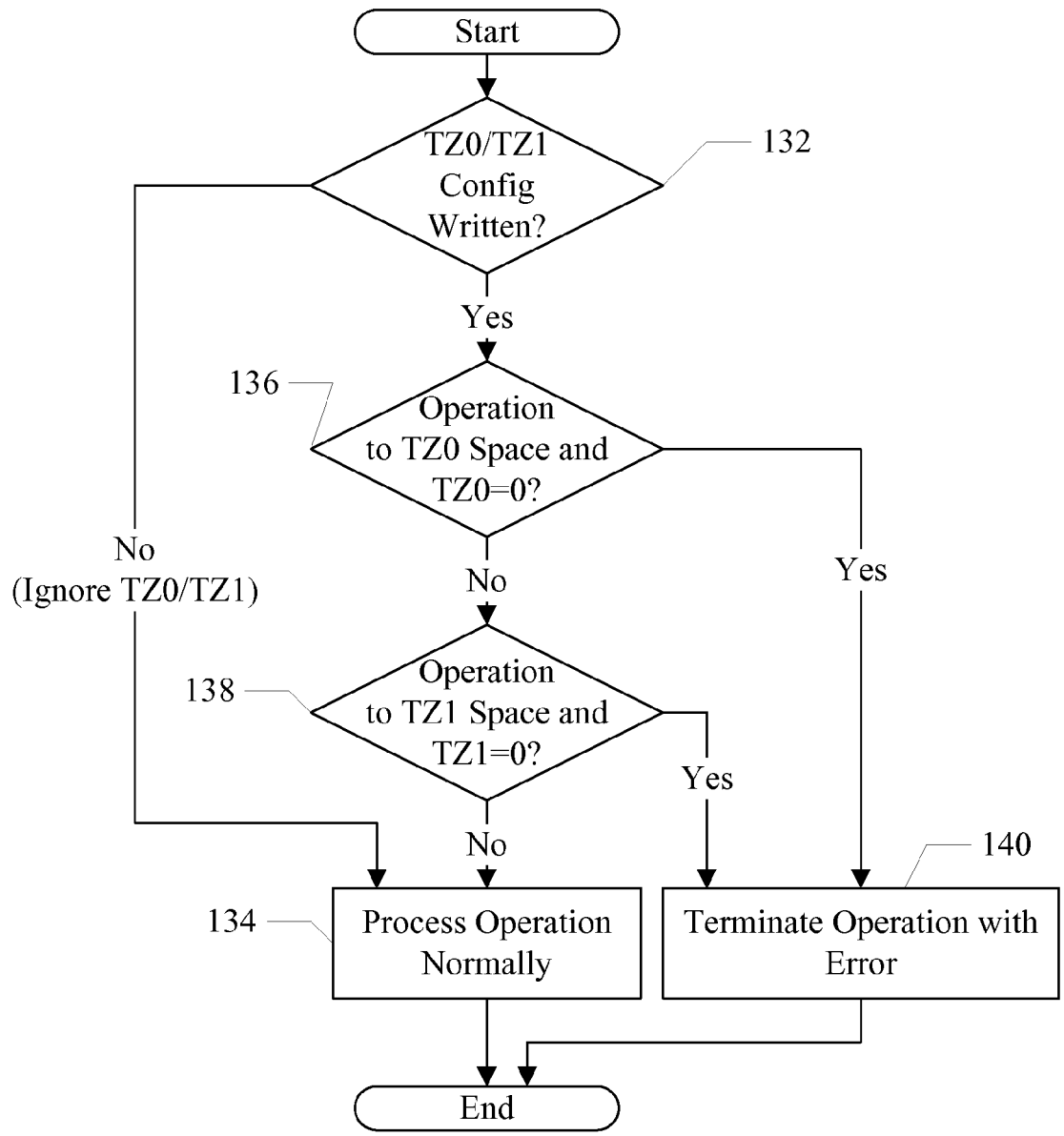
FIG. 9 is a flowchart illustrating operation of one embodiment of the memory controller shown in FIG. 1 for trust zone requests.

FIG. 9 is a flowchart illustrating operation of one embodiment of the memory controller 22 (and more particularly the control circuit 130, in the embodiment of FIG. 8) to implement trust zone security. While the blocks are shown in a particular order for ease of understanding, other orders may be used. Blocks may be performed in parallel by combinatorial logic circuitry in the memory controller 22/control circuit 130. Blocks, combinations of blocks, and/or the flowchart as a whole may be pipelined over multiple clock cycles. The memory controller 22/control circuit 130 may be configured to implement the operation shown in FIG. 9.

The memory controller 22 may determine whether or not the TZ0/TZ1 configuration registers 38 have been written (decision block 132). If not (decision block 132, "no" leg), the memory controller 22 may ignore the TZ0/TZ1 attributes of memory operations and may process the operations normally (block 134). If the TZ0/TZ1 configuration registers 38 have been written (decision block 132, "yes" leg), then the TZ0/TZ1 configuration spaces have been programmed. The memory controller 22 may check if the operation is in the TZ0 space and the TZ0 attribute of the operation is zero (decision block 136), or if the operation is in the TZ1 space and the TZ1 attribute of the operation is zero (decision block 138). In either case (decision block 136, "yes" leg or decision block 138, "yes" leg), the memory controller 22 may terminate the request with an error (block 140). The error may be, e.g., an unimplemented address error that may be signalled by the memory controller 22 when addresses are presented that are not mapped to a memory location in the memory 12 (and not memory-mapped to other components in the SOC 10). For read operations, nonce data may be forwarded with the error. For write operations, the data may be discarded. If the operation is not to TZ0 or TZ1 space, or is to TZ0 or TZ1 space and the corresponding TZ0 or TZ1 attribute is one (decision blocks 136 and 138, "no" legs), the memory controller 22 may process the memory operation normally (block 134). In an embodiment, the configuration registers 38 may be controlled by a lock bit that is cleared only on reset (i.e. writes to the registers 38 may not be used to reset the lock bit). Once the registers are written to program the TZ0/TZ1 spaces, the lock bit may be set and the configuration may not be changed without a chip reset. The lock bit may also serve as an enable for the TZ0/TZ1 spaces, so that they cannot be enabled without also being locked.

Figure 10:
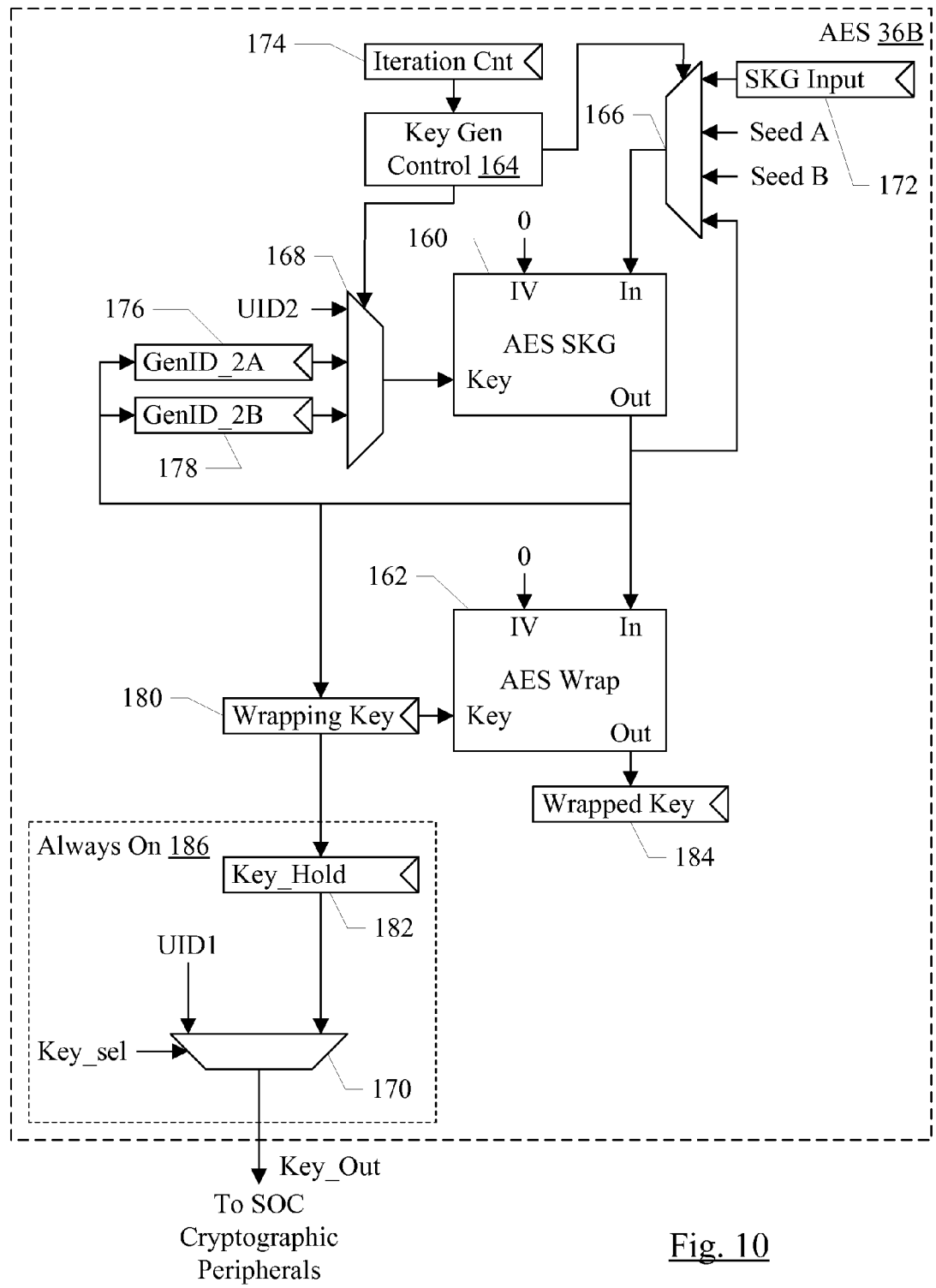
FIG. 10 is a block diagram of one embodiment of an encryption circuit for managing keys using a wrapping key.

Turning now to FIG. 10, a block diagram of one embodiment of the encryption circuit 36B is shown in greater detail. In the illustrated embodiment, the encryption circuit 36B includes encryption subcircuits 160 and 162, key generation control circuit 164, multiplexors (muxes) 166, 168, and 170, and registers 172, 174, 176, 178, 180, 182, and 184. The mux 166 may have inputs coupled to the register 172, fixed seeds A and B, and the output of the encryption subcircuit 160. The output of the mux 166 may be the input of the encryption subcircuit 160. The initial vector input of each encryption subcircuit 160 and 162 may be zero. The register 174 may be coupled to the key generation control circuit 164, which may be coupled to the selection controls of the muxes 166 and 168. The output of the mux 168 may be the key input to the encryption subcircuit 160. Inputs to the mux 168 include a UID2 (from the fuses 68) and the registers 176 and 178, which may be coupled to the output of the encryption subcircuit 160. The output of the encryption subcircuit 160 may be further coupled to the input of the encryption subcircuit 162 and the register 180, which may be coupled to the key input of the encryption subcircuit 162 and the register 182. The output of the encryption subcircuit 162 may be coupled to the register 184. The inputs of the mux 170 include a UID1 (from the fuses 68) and the register 182, and the output of the mux 170 may be the Key_Out output to the various SOC cryptographic peripherals.

The encryption circuit 36B may be configured to perform secure key generation for the SOC 10. The secure keys may be generated, and may be wrapped using a wrapping key so that the secure key itself is not exposed to software. More particularly, software may only have access to registers 172, 174, and 184. The remaining registers in FIG. 10 may be inaccessible to software. Software may program the registers 172 and 174 to generate a desired key, and may read the generated (and wrapped) key from the register 184. Software may deliver the wrapped key to an SOC cryptographic peripheral, which may unwrap the secure key using the wrapping key delivered by the encryption circuit 36B over the Key_Out wires. The secure key may then be used for the cryptographic operations within the SOC cryptographic peripheral.

More particularly, in one embodiment, software may program the register 172 with the secure key generation input to be used to generate a secure key. Additionally, software may program the register 174 with an iteration count. The iteration count may be the number of iterations performed by the encryption subcircuit 160 to generate the secure key. The first iteration may be performed using the contents of the register 172 as the input, and the subsequent iterations may be performed with the output of the encryption subcircuit 160 as the input. Thus, the key generation control circuit 164 may be configured to select the register 172 through the mux 166 for the first iteration of a requested secure key generation, and then the output of the encryption circuit 160 for the subsequent iterations. The key input to the encryption subcircuit 160 for the secure key generation may be any of the keys input to the mux 168. In one embodiment, the key stored in the register 178 may be used.

The encryption subcircuit 162 may receive the secure key generated by the encryption subcircuit, and may be configured to encrypt the key using the wrapping key stored in the register 180. Encrypting the secured key using the wrapping key may also be referred to as wrapping the secure key. The resulting wrapped key may be stored in the wrapped key register 184 for access by software.

Figures 11, 12:
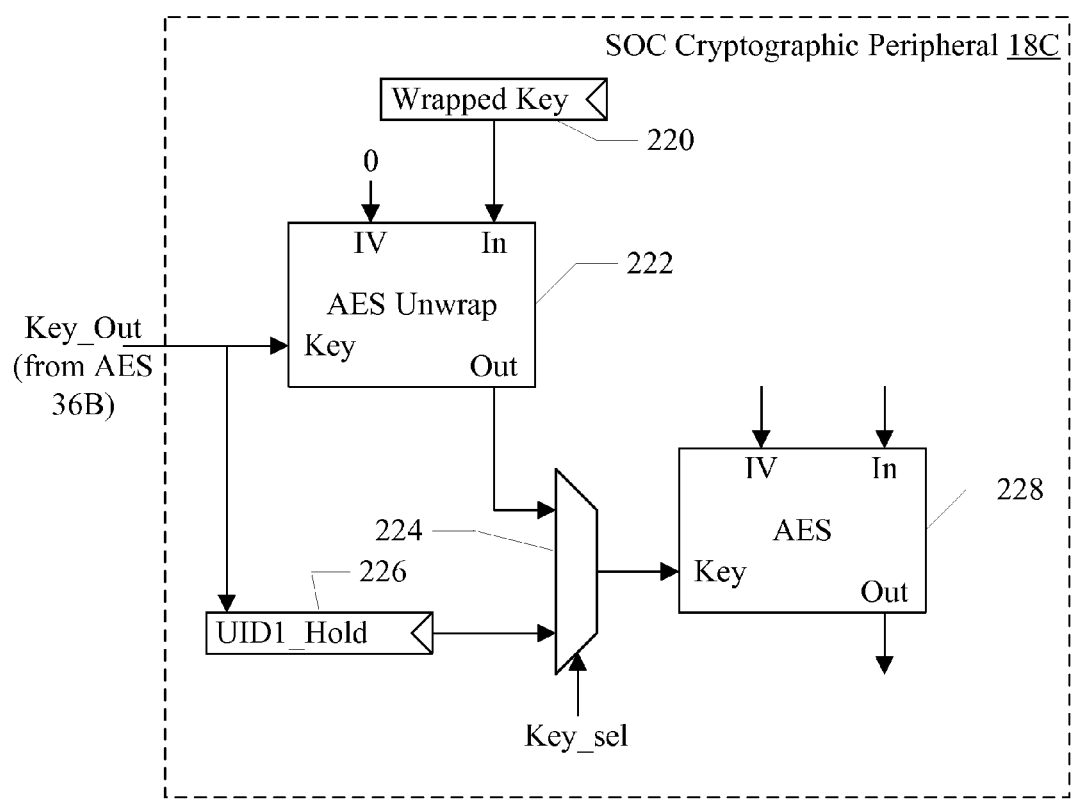
FIG. 11 is a table indicating operation of one embodiment of the AES device shown in FIG. 10 to generate keys.
FIG. 12 is a block diagram of one embodiment of a cryptographic peripheral which receives a wrapped key.

During initialization, the encryption circuit 36B may initialize the wrapping key and the keys in the registers 176 and 178. Thus, the key generation control circuit 164 may be configured to control the selects for the muxes 166 and 166 during initialization to select the desired inputs to generate the keys. FIG. 11 is a table illustrating the selected values to generate various keys. The "key" column indicates the selection through the mux 168. The "in" column indicates the selection through the mux 166. The "count" column indicates the number of iterations to be performed.

The key GenID_2A in the register 176 may be generated as illustrated in the first row of the table in FIG. 11. The key may be UID2, the input to the encryption subcircuit 160 may be Seed A, and one iteration may be performed. The resulting key may be written to the register 176. The key GenID_2B in the register 178 may be generated using the UID2 and Seed B with one iteration, and the result may be written to the register 178. See the second row of the table in FIG. 11. As mentioned previously, Seeds A and B may be fixed (instance-invariant).

Additionally, seeds A and B may be selected to have significantly different entropy characteristics. The wrapping key for the register 180 may be generated using the GenID_2A from the register 176 and the input from the register 172 (which may be programmed by the SEP processor 32). Thus, the wrapping key may differ per-boot, based on the value written by software into the register 172 during initialization. One iteration of the encryption subcircuit 160 may be performed to generate the wrapping key. See the third row of the table in FIG. 11. The fourth row in FIG. 11 shows the generation of a new secure key in response to a request from the SOC 10. The GenID_2B key from the register 178 may be used as the key, and the input from register 172 may be provided as the input to the encryption subcircuit 160. The iteration count may be read from the iteration count register 174, and the output may be the newly-generated secure key. The newly-generated secure key may then be wrapped by the encryption subcircuit 162 using the wrapping key, producing the wrapped key in the wrapped key register 184.

The SEP 16 may be powered down during operation of the SOC 10. However, the wrapping key may be required by the SOC 10 cryptographic peripherals, in order to unwrap secure keys from wrapped keys. While the receiving logic could capture the wrapping key in a register to ensure availability, the receiving logic may itself be powered down when not in use. To ensure availability of the wrapping key, the encryption circuit 36B may include an "always on" section 186. The "always on" section 186 may be powered independent of the rest of the SEP 16, and may be powered on at any time that the SOC 10 is powered on. The register 182 in the always on section may capture the wrapping key, and may provide the wrapping key through the mux 170 on the Key_Out output. Another UID (UID1, different from UID2) from the fuses 68 may also be selectable through the mux 170. In an embodiment, the mux 170 may select UID1 during initialization. Once the wrapping key has been generated and captured into the register 182, the encryption circuit 36B may be configured to toggle the Key sel input to the mux 170 to select the output of the register 182. The encryption circuit 36B may be configured to toggle the Key sel input automatically, or may be programmed by the SEP processor 32 to change the Key sel input. The value of the Key sel input may also be transmitted to other units (e.g. the SOC cryptographic peripherals) to indicate whether UID1 (which may be captured by the SOC cryptographic peripherals) or the wrapping key is being presented on the Key_Out interface.

It is noted that, in some embodiments, the register 182 may also be the key input to the encryption subcircuit 162 and the register 180 may be eliminated. Although not shown in FIG. 10, in some embodiments the encryption circuit 36B may be configured to wrap a key provided directly by software. In such an embodiment, the input to the encryption subcircuit 162 may be selected between the output of the encryption subcircuit 160 and a register providing a key to be wrapped.

FIG. 12 is a block diagram of one embodiment of a cryptographic peripheral 18C which may be part of the SOC 10 similar to the other peripherals 18A-18B, and is external to the SEP 16. The cryptographic peripheral 18C may include a wrapped key register 220, an encryption subcircuit 222, a mux 224, a register 226, and another encryption subcircuit 228. The wrapped key register 220 may be written by software (e.g. executed by the CPU processor 28), and may be coupled to the input of the encryption subcircuit 222. The initial vector (IV) input of the encryption subcircuit 222 may be coupled to zero. The key input to the encryption subcircuit 222 may be the Key_Out connection from the encryption circuit 36B in the SEP 16, which may also be coupled to the register 226. The register 226 and the output of the encryption subcircuit 222 may be inputs to the mux 224, the output of which may be the key input to the encryption subcircuit 228. The selection control of the mux 224 may be the Key sel control, similar to the mux 170 in FIG. 10.

The encryption subcircuit 222 may be configured to unwrap the wrapped key in the register 220 to generate the corresponding secure key. During normal operation, the mux 224 may be selecting the secure key output by the encryption subcircuit 222, and thus the secure key may be input to the encrypting subcircuit 228. The encryption subcircuit 228 may be part of the cryptographic function of the peripheral 18C. There may be other such subcircuits as well, which may also receive the secure key, and there may be other cryptographic subcircuits in the cryptographic peripheral 18C.

It is noted that, while the cryptographic peripheral 18C may be dedicated to cryptographic operations, a given peripheral may include cryptographic operations and other operations. Such a peripheral may include hardware similar to that shown in FIG. 12, along with circuitry to implement the other operations. For example, a video or audio encoder/decoder (codec) may decrypt or encrypt audio/video data, along with codec operations.

Figure 13:
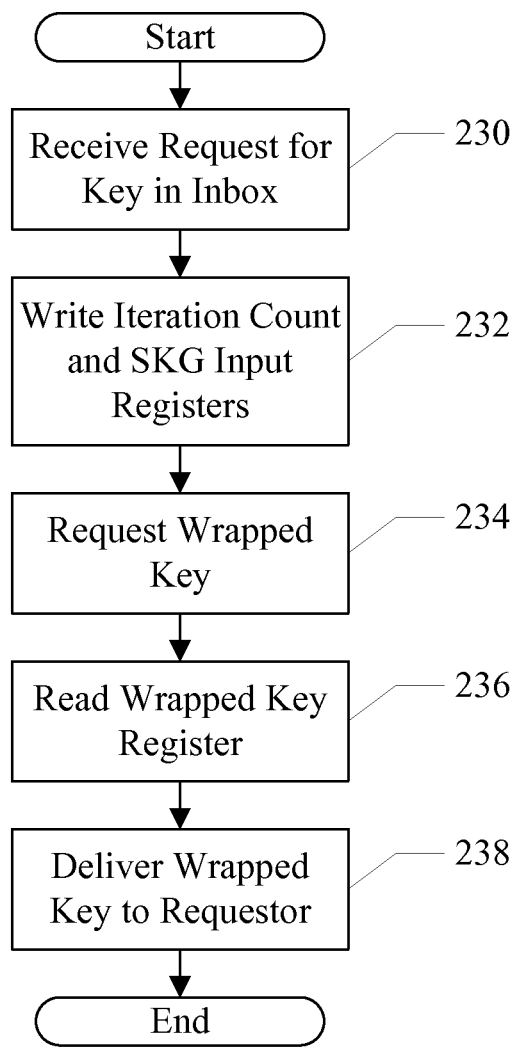
FIG. 13 is a flowchart illustrating operation of one embodiment of code to generate a key for a key requestor.

Turning next to FIG. 13, a flowchart is shown illustrating one embodiment of software executing on the SEP processor 32 to generate a new key for use within the SOC 10. While the blocks are shown in a particular order in FIG. 13 for ease of understanding, other orders may be used. The software executed by the SEP processor 32 may include instructions which, when executed, implement the operation described. For brevity, the description may state that the SEP processor 32 may perform the operations, but it is understood that the SEP processor 32 may perform the operations in response to executing the software. The flowchart of FIG. 13 may be a partial implementation of blocks 106, 108, 110, and 112 in FIG. 6, in an embodiment.

The SEP processor 32 may receive a message containing a request for secure key generation in the inbox portion of the secure mailbox 60 (block 230), and may read and process the message. The message may include parameters for the SKG input register 172 and the iteration count register 174. Alternatively, multiple messages may be received to write the registers 172 and 174 and to request secure key generation. The SEP processor 32 may write the iteration count and SKG input data to the registers 174 and 172, respectively (block 232). The SEP processor 32 may transmit a request to the encryption circuit 36B requesting that the encryption circuit 36B to perform the key generation to produce a wrapped key (block 234). The request may be a read or write operation to a defined address that is interpreted by the encryption circuit 36B as the request, may be a wire from the SEP processor 32 to the encryption circuit 36B, etc., in various embodiments. The encryption circuit 36B may signal that the generation is complete (e.g. via an interrupt to the SEP processor 32, via writing a register that the SEP processor 32 may poll, etc.). The SEP processor 32 may read the wrapped key register 184 when the key generation is complete (block 236), and may deliver the wrapped key to the requester (block 238). The SEP processor 32 may write the outbox portion of the secure mailbox 60 with a message including the wrapped key, or may write the wrapped key to a memory location and may write the outbox with a pointer to the memory location and/or an indication of successful generation.

Figure 14:
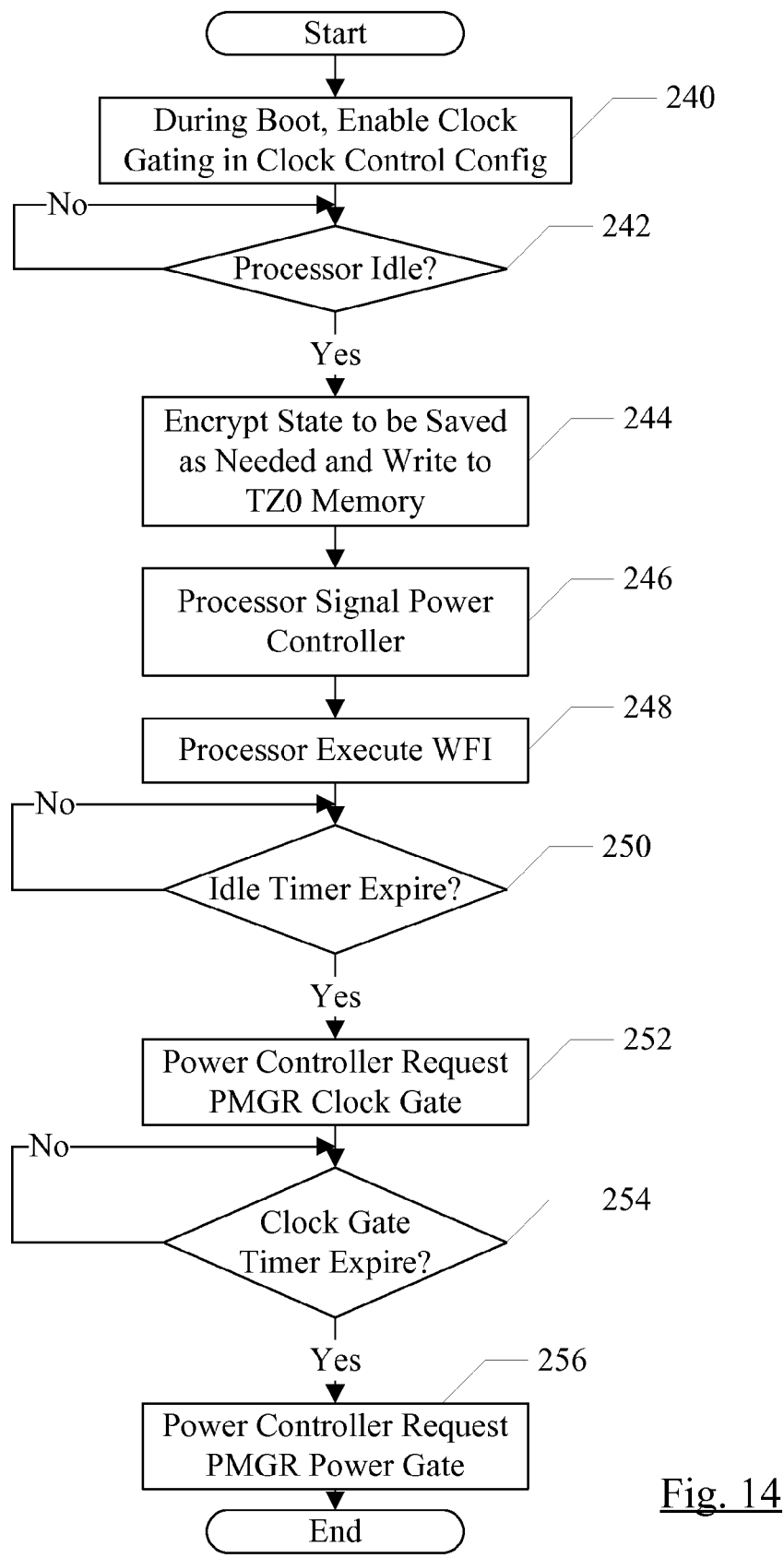
FIG. 14 is a flowchart illustrating operation of one embodiment of the SEP to power manage itself.

Turning now to FIG. 14, a flowchart is shown illustrating operation of one embodiment of the SEP 16 (and various components thereof) to power manage the SEP 16. As mentioned previously, the SEP 16 may control whether or not it is to be powered down. Powering down may not be forced on the SEP 16 from external sources such as the PMGR 20, although the SEP 16 may be powered down if the entire SOC 10 is powered down (e.g. when the system including the SOC 10 is powered off).

During the boot process, the SEP processor 32 may enable clock gating in the circuitry that controls clock gating with the SEP 16 (block 240). In one embodiment, the clock control unit 66 may control clock gating, and may be enabled by writing the configuration registers in the clock control unit 66. In other embodiments, clock gating may be implemented in the PMGR 20 and may be enabled there, but may still be controlled from within the SEP 16 (i.e. the PMGR 20 may not clock gate the SEP 16 or portions thereof absent a request from the SEP 16 to clock gate). In some embodiments, both local clock gating in the SEP 16 and global clock gating under control of the SEP 16 may be implemented.

If the SEP processor 32 (or more particularly the software executing thereon) determines that the SEP processor 32 is idle (decision block 242, "yes" leg), the SEP processor 32 may save state to the TZ0 memory area in the memory 12 (block 244). Some or all of the state may be encrypted as well, as desired (e.g. through the encryption circuit 36A in FIG. 3). The state may be saved in preparation for possible power down, and may include various processor state to return to the current state after a power down, if desired. The state may also include a key for the encryption circuit 36A, the wrapping key for the encryption circuit 36B (which may be encrypted), the seed used to generate the wrapping key, etc.

The SEP processor 32 may signal the local power control unit 64 that the SEP processor 32 is idle (block 246) and then the SEP processor 32 may execute a wait for interrupt (WFI) instruction (block 248). Alternatively, the SEP processor 32 may be configured to signal the local power control unit 64 as part of executing the WFI instruction. The WFI instruction may be an instruction which causes the SEP processor 32 to enter a low power state (e.g. clock gated or power gated). As the instruction mnemonic implies, an interrupt may be used to cause the SEP processor 32 to exit the low power state. In one embodiment, the SEP 16 and/or the PMGR 20 may support one or more programmable attributes indicating whether or not clock gating and/or power gating is permitted for the SEP 16 in response to the WFI instruction. In another embodiment, the attribute(s) may be encoded in each instance of the WFI instruction or may be an operand of the WFI instruction. Programmably selecting whether or not clock gating/power gating is permitted may allow code to take advantage of the power savings of the WFI instruction (e.g. halting instruction execution) even in cases in which the code may not be able to tolerate clock gating/power gating (e.g. because of the latency in restarting from clock gating or power gating).

In response to the signal from the SEP processor 32, the local power control unit 64 may begin timing a first idle timer (decision block 250). The idle timer value may be programmable or fixed, in various embodiments. When the first idle timer expires (and there has been no interrupt to awaken the SEP processor 32, e.g. responsive to a write to the inbox of the secure mailbox 60) (decision block 250, "yes" leg), the local power control unit 64 may request clock gating from the PMGR 20 (block 252). Clock gating from the PMGR 20 may conserve additional power compared to local clock gating within the SEP 16, in some embodiments. The local power control unit 64 may not be clock gated in this embodiment. Once the clock gating request has been made, the local power controller 64 may begin timing a second idle timer (decision block 254), which may be fixed or programmable similar to the first idle timer. If the second idle timer expires (and the SEP processor 32 has not been awakened via an interrupt) (decision block 254, "yes" leg), the local power control unit 64 may request a power down from the PMGR 20 (block 256). In other embodiments, only local clock gating may be performed. In other embodiments, clock gating may be performed in response to the WFI instruction and there may be one idle timer to request power gating. As mentioned previously, clock gating and/or power gating may be enabled/disabled via programmable attributes, as desired. In some embodiments, the PMGR 20 may further be programmable with attributes enabling/disabling clock gating and/or power gating of the SEP 16. These attributes may allow software (e.g. an operating system executing on the CPU complex 14) to control whether or not the SEP 16 is clock gated/power gated when requested by the SEP 16. That is, the PMGR 20 may be programmable to ignore requests for power gating/clock gating from the SEP 16.

Figure 15:
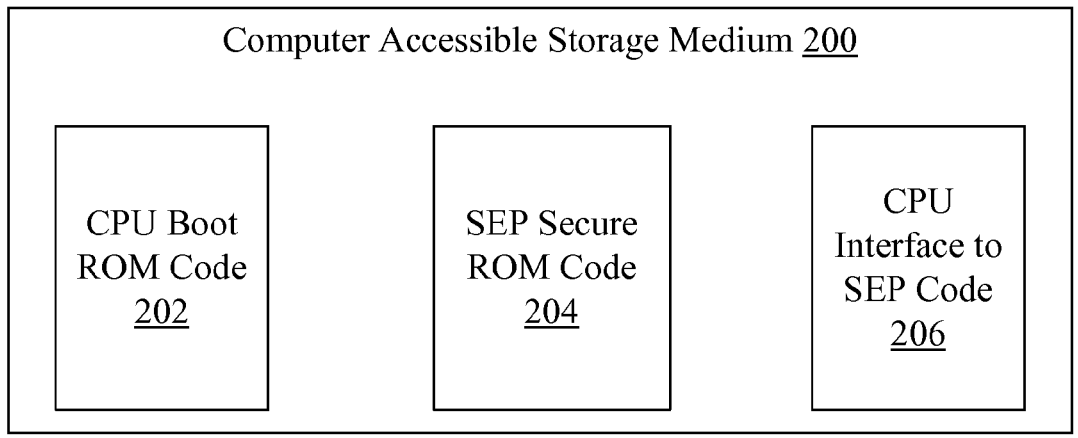
FIG. 15 is a block diagram of one embodiment of a computer accessible storage medium.

Turning now to FIG. 15, a block diagram of one embodiment of a computer accessible storage medium 200 is shown. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g. synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, the computer accessible storage medium 200 may store data in a non-transitory manner, where non-transitory in this context may refer to not transmitting the instructions/data on a signal. For example, non-transitory storage may be volatile (and may lose the stored instructions/data in response to a power down) or non-volatile.

The computer accessible storage medium 200 in FIG. 15 may store one or more of CPU boot ROM code 202, SEP secure ROM code 204, and CPU interface to SEP code 206. The CPU boot ROM code 202 may include instructions which, when executed by a CPU processor 28, implement the operation described for the CPU boot ROM code above. The CPU boot ROM code 202 may be stored in the CPU boot ROM 26, and the computer accessible storage medium 200 may include the CPU boot ROM 26 in some embodiments. Similarly, the SEP secure ROM code 204 may include instructions which, when executed by an SEP processor 32, implement the operation described for the SEP secure ROM code above. The SEP secure ROM code 204 may be stored in the secure ROM 34, and the computer accessible storage medium 200 may include the secure ROM 34 in some embodiments. The CPU interface to SEP code 206 may include instructions which, when executed by the CPU processor 28 and/or the SEP processor 32, implement the operation described for the interface. A carrier medium may include computer accessible storage media as well as transmission media such as wired or wireless transmission.

Figure 16:
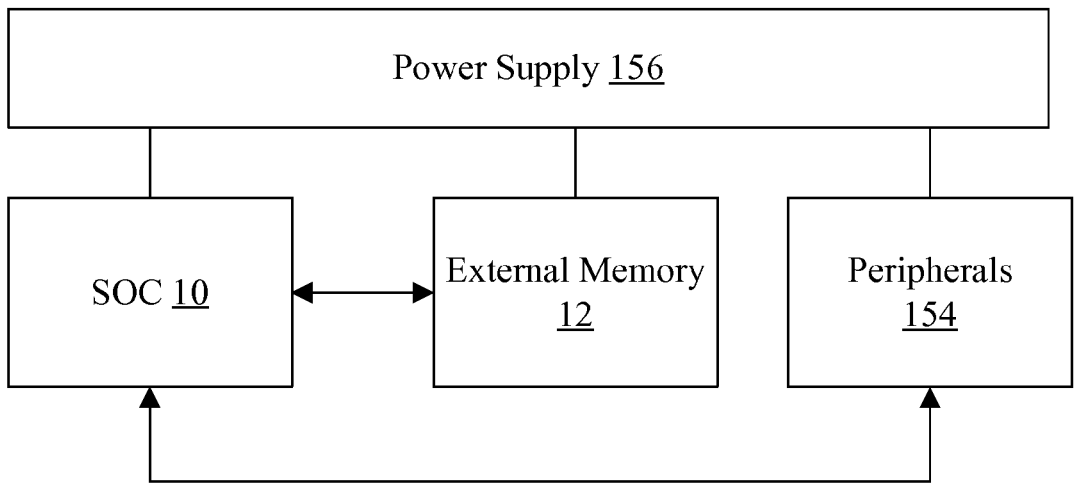
FIG. 16 is a block diagram of one embodiment of a system including the SOC shown in FIG. 1.

Turning next to FIG. 16, a block diagram of one embodiment of a system 150 is shown. In the illustrated embodiment, the system 150 includes at least one instance of the SOC 10 coupled to one or more peripherals 154 and the external memory 12. A power supply 156 is provided which supplies the supply voltages to the SOC 10 as well as one or more supply voltages to the memory 12 and/or the peripherals 154. In some embodiments, more than one instance of the SOC 10 may be included (and more than one memory 12 may be included as well).

The peripherals 154 may include any desired circuitry, depending on the type of system 150. For example, in one embodiment, the system 150 may be a mobile device (e.g. personal digital assistant (PDA), smart phone, etc.) and the peripherals 154 may include devices for various types of wireless communication, such as wifi, Bluetooth, cellular, global positioning system, etc. The peripherals 154 may also include additional storage, including RAM storage, solid state storage, or disk storage. The peripherals 154 may include user interface devices such as a display screen, including touch display screens or multitouch display screens, keyboard or other input devices, microphones, speakers, etc. In other embodiments, the system 150 may be any type of computing system (e.g. desktop personal computer, laptop, workstation, net top etc.).

The external memory 12 may include any type of memory. For example, the external memory 12 may be SRAM, dynamic RAM (DRAM) such as synchronous DRAM (SDRAM), double data rate (DDR, DDR2, DDR3, etc.) SDRAM, RAMBUS DRAM, etc. The external memory 12 may include one or more memory modules to which the memory devices are mounted, such as single inline memory modules (SIMMs), dual inline memory modules (DIMMs), etc. Alternatively, the external memory 12 may include one or more memory devices that are mounted on the SOC 10 in a chip-on-chip or package-on-package implementation.

Numerous variations and modifications will become apparent to those skilled in the art once the above disclosure is fully appreciated. It is intended that the following claims be interpreted to embrace all such variations and modifications.

What is claimed is:

1. A system comprising:
a central processing unit (CPU) complex including at least one first processor; and
a security circuit coupled to the CPU complex and configured to provide one or more secure services in the system, wherein the security circuit includes at least one second processor and a boot read-only memory (ROM) coupled to the at least one second processor, and wherein the boot ROM is inaccessible to circuitry outside the security circuit within the system, and wherein the at least one second processor is configured to boot directly from the boot ROM, and wherein the code from the boot ROM is not stored in software-accessible memory, and wherein the at least one second processor, in response to executing the code, is configured to authenticate the code.

2. The system as recited in claim 1 wherein the at least one second processor comprises an instruction cache configured to cache the code from the boot ROM.

3. The system as recited in claim 1 wherein the at least one second processor comprises a cache that is not software-modifiable, and the at least one second processor is configured to cache the code from the boot ROM in the cache.

4. The system as recited in claim 1 wherein the at least one second processor is hardwired to fetch instructions from the boot ROM in response to being released from reset.

5. The system as recited in claim 1 wherein the at least one second processor is configured to read the instructions directly from the boot ROM, without storing the instructions in modifiable memory external to the at least one second processor.

6. The system as recited in claim 1 wherein the security circuit excludes a random access memory (RAM) for storing the instructions from the boot ROM.

7. The system as recited in claim 1 wherein the at least one second processor is configured to terminate boot and to prevent the system from continuing boot in response to the code failing authentication.

8. The system as recited in claim 7 wherein the at least one second processor, responsive to executing the code, is configured to authenticate boot code for the CPU complex.

9. A method in a system including: a central processing unit (CPU) complex including at least one first processor; and a security circuit including at least one second processor and a boot read-only memory (ROM) coupled to the at least one second processor; and the method comprising:
   booting the at least one second processor directly from the boot ROM, wherein the boot ROM is inaccessible to circuitry outside the security circuit;
   the at least one second processor loading the code from the boot ROM in an instruction cache in the at least one second processor, wherein the code is not stored in software-accessible memory; and
   executing the code, including authenticating the code responsive to executing instructions in the code.

10. The method as recited in claim 9 further comprising caching the code from the boot ROM in an instruction cache within the at least one second processor.

11. The method as recited in claim 9 further comprising caching the code from the boot ROM in a cache that is not software-modifiable.

12. The method as recited in claim 9 wherein the at least one second processor is hardwired to fetch instructions from the boot ROM in response to being released from reset.

13. The method as recited in claim 9 further comprising the at least one second processor reading the instructions directly from the boot ROM, without storing the instructions in modifiable memory external to the at least one second processor.

14. The method as recited in claim 9 wherein the security circuit excludes a random access memory (RAM) for storing the instructions from the boot ROM.

15. The method as recited in claim 9 further comprising the at least one second processor terminating boot and preventing the system from continuing boot in response to the code failing authentication.

16. The method as recited in claim 9 further comprising the at least one second processor, responsive to executing the code, authenticating boot code for the CPU complex.

17. An integrated circuit comprising:
   a security circuit including at least one first processor and a first read-only memory (ROM) configured to store boot code for the at least one first processor, wherein the security circuit isolates the first ROM from a remainder of the integrated circuit, and wherein the at least one first processor is configured to boot directly from the first ROM, and wherein the security circuit stores code from the first ROM only in memory that is not software-accessible, and the security circuit stores the code in the memory responsive to booting from the first ROM, and wherein the at least one first processor, in response to executing the boot code, is configured to authenticate the boot code;
   a central processing unit (CPU) complex comprising at least one second processor; and
   a second boot ROM coupled to the CPU complex, wherein the second boot ROM is configured to store boot code for the at least one second processor.

18. The integrated circuit as recited in claim 17 wherein the at least one first processor comprises an instruction cache, wherein the memory includes the instruction cache.

* * * * *